United States Patent
Shahar et al.

(10) Patent No.: US 9,632,186 B2
(45) Date of Patent: Apr. 25, 2017

(54) SYSTEMS AND METHODS FOR SUB-PIXEL LOCATION DETERMINATION

(71) Applicant: General Electric Company, Schenectady, NY (US)

(72) Inventors: Arie Shahar, Moshav Magshimim (IL); Avishai Ofan, Rehovot (IL); Jeffrey Michael Levy, Tel-Aviv (IL); Yaron Glazer, Rehovot (IL)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/280,640

(22) Filed: Sep. 29, 2016

(65) Prior Publication Data

US 2017/0016998 A1    Jan. 19, 2017

Related U.S. Application Data

(63) Continuation-in-part of application No. 14/724,022, filed on May 28, 2015, now Pat. No. 9,482,764.

(51) Int. Cl.
*G01D 18/00* (2006.01)
*G01T 1/24* (2006.01)
(Continued)

(52) U.S. Cl.
CPC .............. *G01T 1/241* (2013.01); *G01T 1/161* (2013.01); *G01T 1/24* (2013.01); *G01T 1/247* (2013.01); *G01T 1/2928* (2013.01)

(58) Field of Classification Search
CPC ......... G06T 7/0012; G06T 2207/10081; G06T 2207/30061; G06T 2207/30096;
(Continued)

(56) References Cited

U.S. PATENT DOCUMENTS 6,169,287 B1    1/2001   Warburton
9,482,764 B1 *  11/2016  Shahar ............... G01T 7/005
(Continued)

FOREIGN PATENT DOCUMENTS

WO    2014173812 A1    10/2014

OTHER PUBLICATIONS

International Search Report and Written Opinion dated Jul. 15, 2016 for corresponding PCT Application No. PCT/US2016/029465 filed Apr. 27, 2016 (11 pages).
(Continued)

*Primary Examiner* — David Porta
*Assistant Examiner* — Meenakshi Sahu
(74) *Attorney, Agent, or Firm* — Dean D. Small; The Small Patent Law Group, LLC.

(57) ABSTRACT

A radiation detector system is provided including a semiconductor detector, plural pixelated anodes, and at least one processor. The plural pixelated anodes are disposed on a surface of the detector. At least one of the pixelated anodes is configured to generate a collected charge signal corresponding to a charge collected by the pixelated anode and to generate a non-collected charge signal corresponding to a charge collected by an adjacent anode to the pixelated anode. The at least one processor is configured to determine a collected value for the collected charge signal in the pixelated anode; determine a non-collected value for the non-collected charge signal in the pixelated anode corresponding to the charge collected by the adjacent anode; use the non-collected value for the non-collected charge signal to determine a sub-pixel location for the adjacent anode; and use the collected value to count a single event in the pixelated anode.

20 Claims, 14 Drawing Sheets

(51) Int. Cl.
*G01T 1/161* (2006.01)
*G01T 1/29* (2006.01)

(58) Field of Classification Search
CPC .... G06T 2207/30101; A61B 2019/524; A61B 6/4233; A61B 6/4241; A61B 6/467; A61B 6/482; A61B 6/5235; A61B 8/14; G06K 9/036; G06K 9/00013; G06K 9/00026; G06K 9/00006; G06K 9/0002; G06K 9/0004; G06K 9/00053; G06K 9/00073; G06K 9/00087; G06K 9/00127; G06K 9/00744; G06K 9/6268
USPC .... 250/252.1, 370.08, 370.01, 370.09, 370.1
See application file for complete search history.

(56) References Cited

U.S. PATENT DOCUMENTS

| | | | |
|---|---|---|---|
| 2007/0023669 A1* | 2/2007 | Hefetz | A61B 6/032 250/370.14 |
| 2008/0149842 A1 | 6/2008 | El-Hanany et al. | |
| 2014/0048714 A1* | 2/2014 | Shahar | G01T 1/247 250/370.08 |
| 2015/0063671 A1* | 3/2015 | Shahar | G01T 1/1647 382/132 |

OTHER PUBLICATIONS

Warburton, An Approach to Sub-Pixel Spatial Resolution in Room Temperature X-Ray Detector Arrays with Good Energy Resolution, X-ray Instrumentation Associates (XIA), 2513 Charleston Road STE 207, Mountain View, CA 94043-1607, USA.

* cited by examiner

SYSTEMS AND METHODS FOR SUB-PIXEL LOCATION DETERMINATION

RELATED APPLICATIONS

The present application is a continuation in part of, and claims priority to, U.S. patent application Ser. No. 14/724,022, entitled "Systems and Methods for Charge-Sharing Identification and Correction Using a Single Pixel," filed 28 May 2015, the entire subject matter of which is hereby incorporated by reference.

BACKGROUND

The subject matter disclosed herein relates generally to medical imaging systems, and more particularly to identifying and correcting charge-sharing events.

In nuclear medicine (NM) imaging, such as single photon emission computed tomography (SPECT) or positron emission tomography (PET) imaging, radiopharmaceuticals are administered internally to a patient. Detectors (e.g., gamma cameras), typically installed on a gantry, capture the radiation emitted by the radiopharmaceuticals and this information is used, by a computer, to form images. The NM images primarily show physiological function of, for example, the patient or a portion of the patient being imaged.

The detectors may include an array of pixelated anodes. If radiation emitted due to the radiopharmaceuticals is absorbed by the detector at a position resulting in sharing of the detected resulted charge between adjacent pixels, a shared charge event may occur. Shared charge events may not be large enough on either of the adjacent pixelated anodes to be recognized as an event to be counted, resulting in lost information and under counting. Certain known approaches for recovering or correcting charge-sharing events employ a concept of combining information from two adjacent pixels sharing a shared charge event. However, such approaches may have a number of drawbacks. For example, if one of a pair of events is below a threshold, the event may not be detected. As another example, a signal recovered from two pixels may be subject to additional noise (e.g., noise from two pixels instead of one), which may reduce a signal to noise ratio. Use of information from two pixels requires time-coincidence detection, addition computational or processing complexity. Further, use of information from two pixels may result in surface-recombination loss and/or may suffer from random coincidence of signals in adjacent pixels being mis-interpreted as a shared charge event.

BRIEF DESCRIPTION

In accordance with an embodiment, a radiation detector system is provided including a semiconductor detector, plural pixelated anodes, and at least one processor. The semiconductor detector has a surface, and the plural pixelated anodes are disposed on the surface. At least one of the pixelated anodes is configured to generate a collected charge signal corresponding to a charge collected by the pixelated anode and to generate a non-collected charge signal corresponding to a charge collected by an adjacent anode to the pixelated anode. The at least one processor is operably coupled to the pixelated anodes, the at least one processor comprising a tangible and non-transitory memory having stored thereon instructions configured to direct the at least one processor to determine a collected value for the collected charge signal in the pixelated anode; determine a non-collected value for the non-collected charge signal in the pixelated anode corresponding to the charge collected by the adjacent anode; use the non-collected value for the non-collected charge signal to determine a sub-pixel location for the adjacent anode; and use the collected value to count a single event in the pixelated anode.

In accordance with another embodiment, a method is provided that includes acquiring charge event information with a radiation detector comprising plural pixelated anodes disposed on a surface of the radiation detector. The method also includes generating, for a charge event, a combined charge signal comprising a collected charge signal corresponding to a charge collected by a pixelated anode and a non-collected charge signal corresponding to a charge collected by an adjacent anode. Also, the method includes determining, with at least one processor, a collected value for the collected charge signal in the pixelated anode. Further, the method includes determining, with the at least one processor, a non-collected value for the non-collected charge signal in the pixelated anode corresponding to the charge collected by the adjacent anode. The method also includes using the non-collected value for the non-collected charge signal to determine a sub-pixel location for the adjacent anode; and using the collected value to count a single event in the pixelated anode.

In accordance with another embodiment, a tangible and non-transitory computer readable medium is provided that includes one or more software modules. The one or more software modules configured to direct one or more processors to acquire charge event information with a radiation detector comprising plural pixelated anodes disposed on a surface of the radiation detector; generate, for a charge event, a combined charge signal comprising a collected charge signal corresponding to a charge collected by a pixelated anode and a non-collected charge signal corresponding to a charge collected by an adjacent anode; determine a collected value for the collected charge signal in the pixelated anode; determine a non-collected value for the non-collected charge signal in the pixelated anode corresponding to the charge collected by the adjacent anode; determine a sub-pixel location for the adjacent anode using the non-collected value for the non-collected charge signal; and use the collected value to count a single event in the pixelated anode.

DETAILED DESCRIPTION

Figure 1:
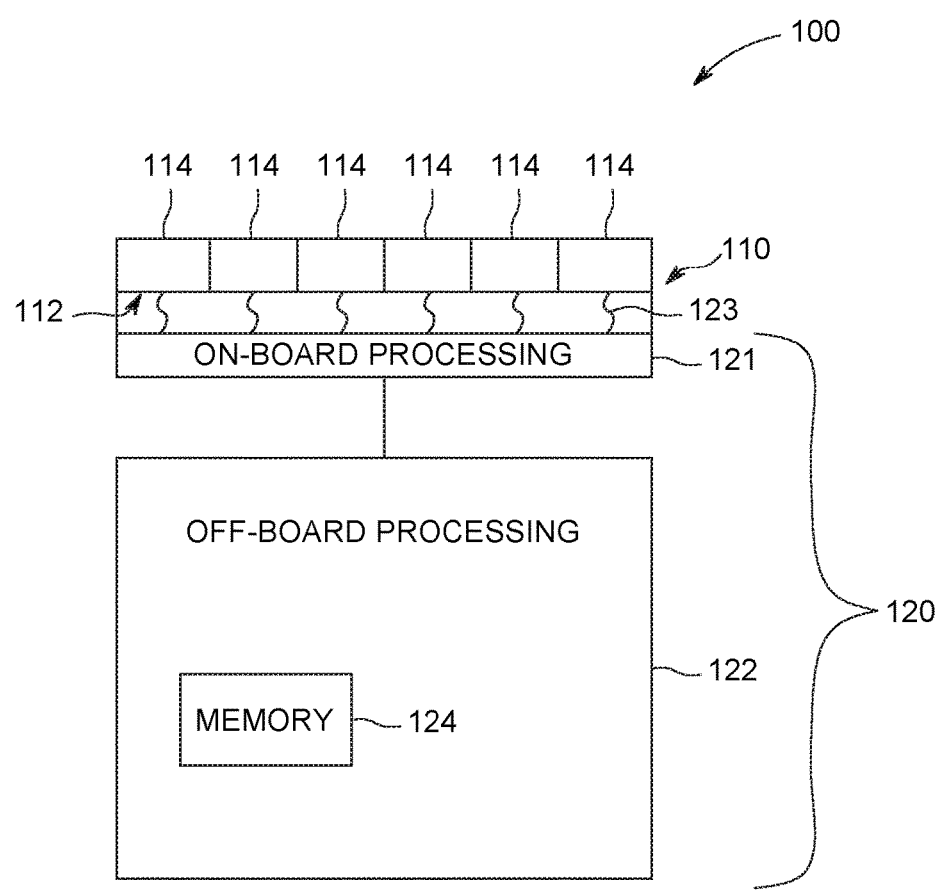
FIG. 1 provides a schematic view of a radiation detector system according to an embodiment.

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor, ASIC, FPGA, or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for identifying, recovering or correcting shared charge events using information from a single pixelated anode of a pair of anodes sharing charge. Generally, in various embodiments, a signal generated by a pixelated anode corresponding to total charge detected is acquired. The signal is analyzed to identify a portion of the total charge signal attributable to charge collected by the pixelated anode and/or a collected charge value. The signal is also analyzed to identify a portion of the total charge signal attributable to non-collected charge that is detected by the pixelated anode as the charge passes from the cathode to the anode but is not collected by the pixelated anode, instead being collected by an adjacent pixelated anode. The collected charge and the non-collected charge may then be used to identify, recover or correct a shared charge event, which may be counted and included with other counted events to reconstruct an image.

In a charge sharing event for which the total charge of the event is distributed between multiple anodes (e.g., pixelated anodes), the individually collected charge for the individual anodes may not exceed the value that is useful for image reconstruction. In such a case, the signal of the charge sharing event from the multiple anodes associated with the event may not be counted and accordingly lost for the purpose of image reconstruction. However, by recovering or correcting the charge sharing event, the total charge produced, by the charge sharing event (which is distributed across multiple anodes) may be counted as if it had been produced in one anode, and thus would exceed the necessary charge value needed for image reconstruction. Thus, the charge sharing event may be counted instead of being lost for the purpose of imaging.

In various embodiments, identifying a charge event may be understood to include identifying the total charge produced in the detector, by a sharing event, which is collected by multiple anodes, and counting the charge sharing event as a recovered or corrected event related to only one of the multiple anodes, with the total charge collected by the multiple anodes attributed to one of the anodes. In the process of recovering or correcting a sharing event, a calibration factor K may be used to determine the value of the charge collected by an adjacent anode, for example by applying the calibration factor K to a value of the charge induced on the non-collecting anode.

A technical effect of at least one embodiment includes improved image quality (e.g., due to more accurate or reliable counting of events). A technical effect of at least one embodiment includes recovery of more events that are below a threshold energy for a single pixel. A technical effect of at least one embodiment includes improved signal to noise ratio and improved energy resolution. A technical effect of at least one embodiment includes reduction or elimination of use of timing coincidence information between two pixels to identify shared charge events. A technical effect of at least one embodiment includes reduction or elimination of random-coincidence errors from information from neighboring pixels. A technical effect of at least one embodiment includes reduction in computation requirements and/or reduction in the number and/or complexity of computational componentry.

Figure 2:
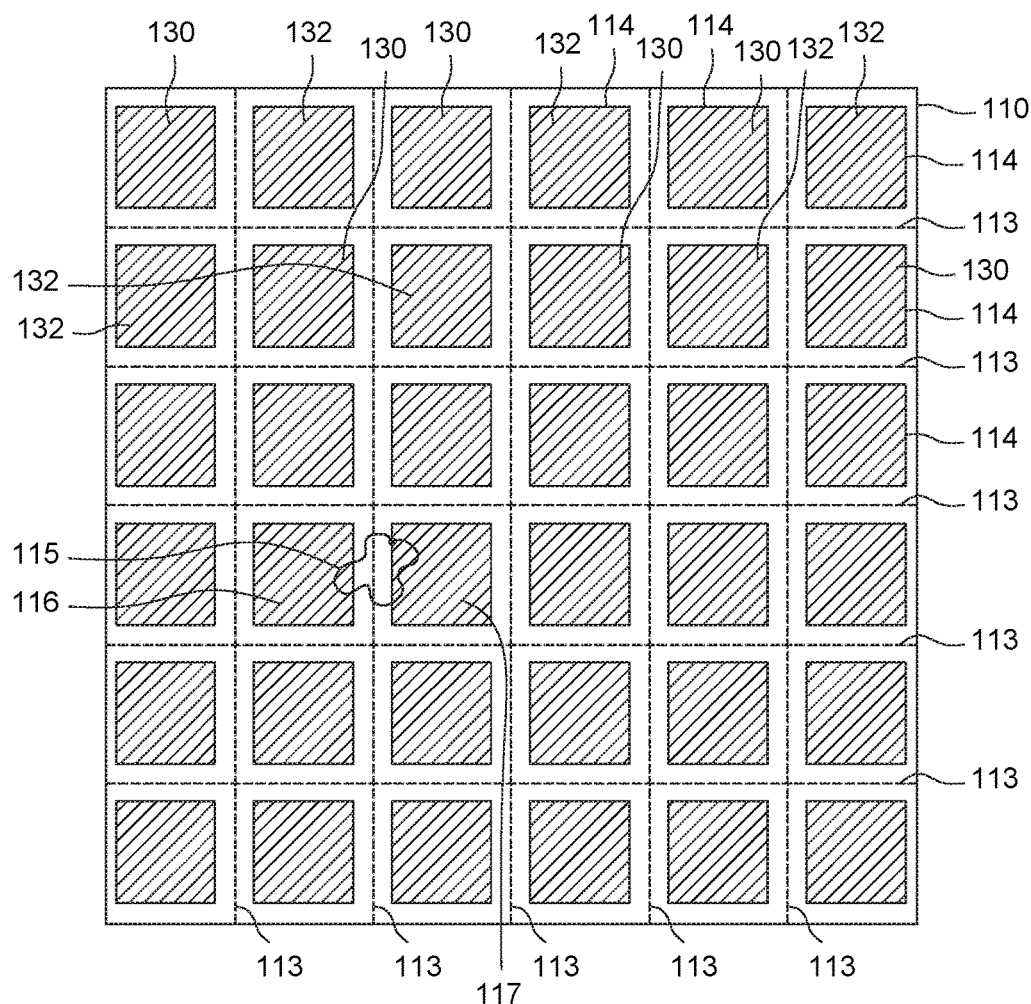
FIG. 2 provides a plan view of a semiconductor detector of the radiation detector system of FIG. 1.

FIG. 1 provides a schematic view of a radiation detector system 100 in accordance with various embodiments. As seen in FIG. 1, the radiation detector system 100 includes a semiconductor detector 110 (FIG. 2 provides a plan view of the semiconductor detector 110) and a processing unit 120. The semiconductor detector 110 has a surface 112 on which plural pixelated anodes 114 are disposed. In various embodiments a cathode (not shown in FIG. 1) may be disposed on a surface opposite the surface 112 on which the pixelated anodes 114 are disposed. For example, a single cathode may be deposited on one surface with the pixelated anodes disposed on an opposite surface. Generally, radiation (e.g., one or more photons) penetrates via the cathode and is absorbed in the volume of detector 110 under the surface 112 and pixelated anodes 114. The semiconductor detector 110 generates electrical signals corresponding to the radiation mentioned above. In the illustrated embodiment, the pixelated anodes 114 are shown in a 6×6 array for a total of 36 pixelated anodes 114; however, it may be noted that other numbers or arrangements of pixelated anodes may be used in various embodiments. Each pixelated anode 114, for example, may have a surface area of 2.5 millimeters square; however, other sizes and/or shapes may be employed in various embodiments. As seen in FIG. 2, the pixelated anodes 114 are separated by charge sharing lines 113 or split lines. A charge sharing line may be understood as corresponding to a location for portions of a charge cloud passing therethrough will be detected by adjacent pixels sharing the charge sharing line as the electron cloud passes from the cathode to the anodes. Put another way, for an electron cloud having at least a portion thereof located along a charge sharing line or path, a portion of the electron cloud will be detected by one anode disposed along the charge sharing line as the cloud passes from the cathode to the anode, while another portion of the electron cloud will be detected by the other or adjacent anode as the electron cloud passes from the cathode to the anode. In the illustrated embodiment, a charge sharing event 115 results in an electron cloud shared by pixelated anode 116 and adjacent pixelated anode 117 as the electron cloud passes from the cathode to the pixelated anodes.

The semiconductor detector 110 in various embodiments may be constructed using different materials, such as semiconductor materials, including Cadmium Zinc Telluride (CdZnTe), often referred to as CZT, Cadmium Telluride (CdTe), and Silicon (Si), among others. The detector 110 may be configured for use with, for example, nuclear medicine (NM) imaging systems, positron emission tomography (PET) imaging systems, and/or single photon emission computed tomography (SPECT) imaging systems.

The volumes of detector 110 under pixelated anodes 114 are defined as voxels. For each pixelated anode 114, detector 110 has a corresponding voxel. The absorption of a photon by a certain voxel corresponding to a particular pixelated anode 114 results in generation of a signal by the pixelated anode 114.

In the illustrated embodiment, at least some of the pixelated anodes 114 generate different signals depending on the location of where a photon is absorbed in the volume of detector 110 under the surface 112. For example, in some embodiments, each pixelated anode 114 generates a collected charge signal corresponding to charge collected by the pixelated anode 114, and generates a non-collected charge signal corresponding to charge collected by an adjacent anode. It may be noted that the collected charge signal and non-collected charge signal may be understood as contributing portions that together form or constitute a combined charge signal. A collected charge signal may be understood as a signal generated responsive to all or a portion of an electron cloud passing from the cathode to the anode that is eventually collected by a given pixelated anode, while a non-collected charge signal may be understood as a signal generated responsive to a portion of an electron cloud passing from the cathode to the anode that is eventually collected by an adjacent pixelated anode. For the example embodiment, for instance, the charge sharing event 115 eventually results in a portion of an electron cloud (depicted as A in FIG. 3) passing from the cathode and being collected by the pixelated anode 116. However, because the charge sharing event 115 results in an electron cloud passing through the charge sharing line 113 between the pixelated anode 116 and the adjacent pixelated anode 117, a portion of the electron cloud (depicted as B in FIG. 3) is detected by adjacent pixelated anode 117.

Figure 3:
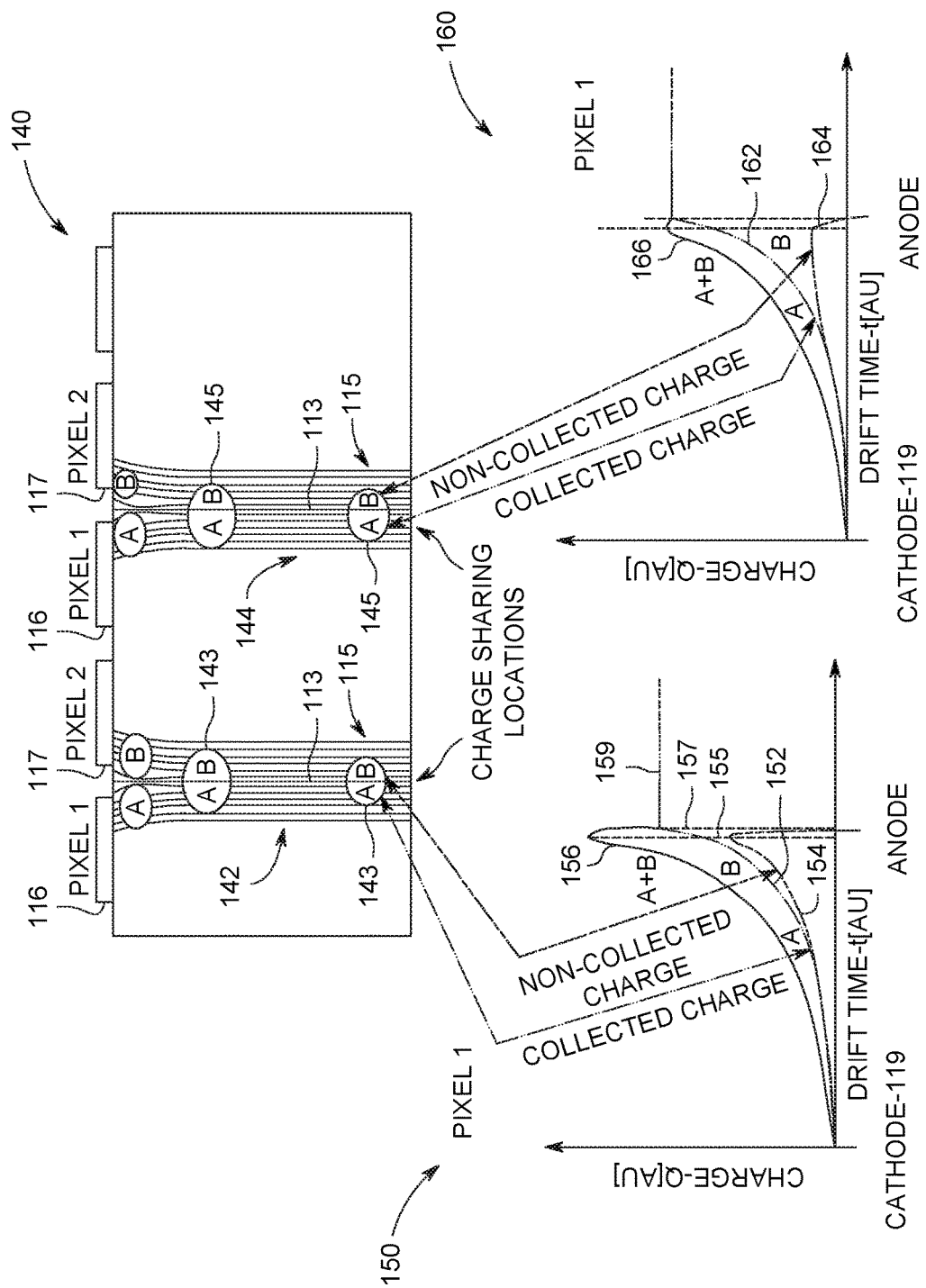
FIG. 3 illustrates example scenarios of electron cloud sharing due to a charge sharing event according to an embodiment.

FIG. 3 illustrates example scenarios of electron cloud sharing due to the charge sharing event 115. View 140 provides a side schematic view of a first example scenario 142 and a second example scenario 144. In the first example scenario 142, the charge sharing event 115 is nearly evenly split between the pixelated anode 116 and the adjacent pixelated anode 117, or the electron cloud 143 corresponding to the charge sharing event is nearly evenly divided by the charge sharing line 113. Graph 150 shows the charge of various signals plotted against drift time of the electron cloud 143 resulting from the charge sharing event 115 of the first example scenario 142. The graph 150 shows, for the pixelated anode 116, a collected charge signal 152, a non-collected charge signal 154, and a combined charge signal 156. In the illustrated embodiment, each of the pixelated anodes is provided with the same voltage, so that the pixelated anodes are symmetrically distributed about the charge sharing line, the collected charge signal 152 corresponds to the portion A of the electron cloud 143 disposed on the same side of the charge sharing line 113 as the pixelated anode 116 during passage of the electron cloud 143 from the cathode 119 to the anode and collection by the anode, and the non-collected charge signal 154 corresponds to the portion B of the electron cloud 143 disposed on the same side of the charge sharing line 113 as the adjacent pixelated anode 117 during passage of the electron cloud 143 from the cathode 119 to the anode. The combined signal 156 corresponds to the sum of the collected charge signal 152 and the non-collected charge signal 154.

As seen in graph 150, the collected charge signal 152 generated by the pixelated anode 116 generally increases as the electron cloud 143 approaches the anode including the pixelated anode 116, until a peak position is reached at time 157, at which time the charge of portion A of the electron cloud 143 is collected by the pixelated anode 116. In some embodiments, the value of the collected charge signal 152 may be stored on a feedback capacitor of a charge sensitive amplifier (CSA) (e.g., a CSA of the on-board portion 121 of the processing unit 120) and remains generally constant for portion 159 of the collected charge signal 152.

As also seen in graph 150, the non-collected charge signal 154 generated by the pixelated anode 116 generally increases as the electron cloud 143 approaches the anode including the pixelated anode 116 and the adjacent pixelated anode 117, until a peak position is reach at time 155, following which the non-collected charge signal 154 drops to zero as the portion B resulting in the non-collected charge signal 154 generated by the pixelated anode 116 is collected by the adjacent pixelated anode 117 instead of the pixelated anode 116. The non-collected charge initially induces positive current on the pixelated anode 116 while the non-collected charge moves toward the anodes 114. Just before being collected by the adjacent anode 117, the non-collected charge moves away from the pixelated anode 116 toward the adjacent anode 117 and thus induces negative current on the pixelated anode 116. Accordingly, for example, the total integrated charge on a feedback capacitor of a CSA coupled to the pixelated anode 116 reaches a maximum value at time 155 by the integration of the positive current and subsequently drops down to zero by the integration of the negative current. The combined signal 156 accordingly increases to a peak value at about time 155 and then drops to the value of the collected charge signal 152 after time 157.

In the second example scenario 144, the charge sharing event 115 is less evenly split between the pixelated anode 116 and the adjacent pixelated anode 117, with the portion A (the portion corresponding to the collected charge signal for the pixelated anode 116) of electron cloud 145 being more noticeably larger than the portion B (the portion corresponding to the non-collected charge signal for the pixelated anode 116, or the portion collected by the adjacent pixelated anode 117) than in the first example scenario 142. Graph 160 shows the charge of various signals plotted against drift time of the electron cloud 145 resulting from the charge sharing event 115 of the second example scenario 144. The graph 160 shows, for the pixelated anode 116, a collected charge signal 162, a non-collected charge signal 164, and a combined charge signal 166. In the illustrated embodiment, each of the pixelated anodes is provided with the same voltage, so that the pixelated anodes are symmetrically distributed about the charge sharing line, the collected charge signal 162 corresponds to the portion A of the electron cloud 145 disposed on the same side of the charge sharing line 113 as the pixelated anode 116 during passage of the electron cloud 145 from the cathode 119 to the anode and collection by the anode, and the non-collected charge signal 164 corresponds to the portion B of the electron cloud 145 disposed on the same side of the charge sharing line 113 as the adjacent pixelated anode 117 during passage of the electron cloud 145 from the cathode 119 to the anode. The combined signal 166 corresponds to the sum of the collected charge signal 162 and the non-collected charge signal 164.

It may be noted that the same general principles apply to the second example scenario 144 as the first example scenario 142; however, in the second example scenario, the peak value of the collected charge signal 162 is relatively larger than the peak value of the collected charge signal 152 (with the total charge of the electron clouds 143 and 145 being even). Also, the value of the collected charge signal 162 relative to the non-collected charge signal 164 is higher than the value of the collected charge signal 152 relative to the non-collected charge signal 154.

Returning to FIG. 1, in the illustrated embodiment, the processing unit 120 (e.g., the on-board portion 121 of the processing unit 120) is operably coupled separately to each of the pixelated anodes 114 of the semiconductor detector 110 via pathways 123. The depicted processing unit 120 is configured (e.g., may include one or more ASIC's and/or FPGA's, and/or includes or is associated with a tangible and non-transitory memory having stored thereon instruction configured to direct the processor) to determine a collected value for the collected charge signal, determine a non-collected value for the non-collected charge signal, and identify a charge-sharing event for a pixelated anode (e.g., a charge-sharing event for the pixelated anode 116 with the adjacent pixelated anode 117). For example, if the combined value of the collected and non-collected charge signals (and/or the value of one or both of the collected or non-collected charge signals) satisfy one or more thresholds corresponding to an event having an energy corresponding to a photon impact, the shared charge event may be counted as an event for the pixelated anode and used in image reconstruction. If the value does not satisfy one or more thresholds, the event may be discarded and not counted. The thresholds may be set, for example, to reduce or eliminate the counting of noise as an event, to reduce or eliminate double counting of an event for both of adjacent pixelated anodes sharing the event, and/or to reduce or eliminate errors due to random coincidence between adjacent pixels. As the processing unit 120 is able to identify a given shared charge event using information from only a single pixel, the radiation detection system 100 allows for identification, recovering or correcting sharing charge, and counting of the corrected charge-sharing event using information from only a single pixelated anode, eliminating the need for timing coincidence information from two or more pixels to identify and correct shared charge event, and simplifying computational requirements.

In various embodiments the processing unit 120 includes processing circuitry configured to perform one or more tasks, functions, or steps discussed herein. It may be noted that "processing unit" as used herein is not intended to necessarily be limited to a single processor or computer. For example, the processing unit 120 may include multiple processors, ASIC's, FPGA's, and/or computers, which may be integrated in a common housing or unit, or which may distributed among various units or housings. It may be noted that operations performed by the processing unit 120 (e.g., operations corresponding to process flows or methods discussed herein, or aspects thereof) may be sufficiently complex that the operations may not be performed by a human being within a reasonable time period. For example, the determination of values of collected, non-collected, and/or combined charge signals within the time constraints associated with such signals may rely on or utilize computations that may not be completed by a person within a reasonable time period.

In the illustrated embodiment, the processing unit 120 includes an on-board portion 121, an off-board portion 122, and a memory 124. It may be noted that other types, numbers, or combinations of modules or portions may be employed in alternate embodiments, and/or various aspects of modules or portions described herein may be utilized in connection with different modules or portions additionally or alternatively. Generally, the various aspects of the processing unit 120 act individually or cooperatively with other aspects to perform one or more aspects of the methods, steps, or processes discussed herein.

The memory 124 may include one or more computer readable storage media. The memory 124, for example, may store information corresponding to the values of one or more signals, count information for the pixelated anodes, image data corresponding to images generated, results of intermediate processing steps, calibration parameters, or the like. Further, the process flows and/or flowcharts discussed herein (or aspects thereof) may represent one or more sets of instructions that are stored in the memory 124 for direction of operations of the radiation detector system 100.

It may be noted that, in various embodiments, one or more aspects of the processing unit 120 may be shared with the detector 110, associated with the detector 110 and with each of its anodes 114, and/or disposed onboard the detector 110. For example, in some embodiments, at least a portion of the processing unit 120 is integrated with the semiconductor detector 110. In various embodiments, at least a portion of the processing unit 120 includes at least one application specific integrated circuit (ASIC) or field programmable gate array (FPGA) that is disposed onboard or integrated with the semiconductor detector 110.

For example, the depicted processing unit 120 includes an on-board portion 121 and an off-board portion 122. The on-board portion 121 is disposed on-board, or on a same physical unit, with the semiconductor detector 110. The on-board portion 121, for example, may include one or more ASIC's operably coupled to one or more corresponding pixelated anodes. The on-board portion 121, for example, may be configured to perform thresholding analysis and/or charge sharing correction and analysis as discussed herein to identify and count events. The off-board portion 122 in the illustrated embodiment is physically separate, or provided in a different housing, than the semiconductor detector 110, and is operably coupled to the off-board portion 122 and/or the pixelated anodes of the semiconductor detector. The off-board portion 122, for example, may utilize the counted events from a give scan to reconstruct an image. While the memory 124 is schematically depicted as a portion of the off-board portion 122, it may be noted that the memory 124 or a portion thereof may also be disposed on-board.

It may be noted that because the collected charge signal 152, 162 has a longer duration than the non-collected charge signal 154, 164, the collected charge signal 152, 162 may be independently detected or measured. However, because the non-collected charge signal 154, 164 may only occur during the presence of the collected charge signal 152, 162, the non-collected charge signal 154, 164 may not be able to be directly detected or measured independently of the collected charge signal 152, 162. In various embodiments, the processing unit 120 is configured to determine a combined value corresponding to a sum of the collected charge signal and the non-collected charge signal, and to determine the non-collected value using a difference between the combined value and a value of the collected charge signal. For example, with continued reference to graph 150 of FIG. 3, the peak value of the combined signal 156 at time 155 may be used as the combined value A+B, and the peak value of the collected charge signal 152 for portion 159 may be used as the value A of the collected charge signal, with the peak value of the collected charge signal 152 at portion 159 subtracted from the peak value of the combined signal 156 at time 155 to provide a value B for the non-collected charge. Once determined, the values A and B may be determined to identify, correct, and properly count charge sharing events. For example, the total value of the charge corresponding to the event may be determined from A and B, and if the total value of the charge is within a range corresponding to an event to be counted, and/or if the total charge produced by a charge sharing event is calculated to exceed a predetermined value, the event may be counted. If, however, the total value is outside of the range (e.g., corresponds to Compton scattering, noise, or random coincidence), or does not exceed the predetermined value, the event may be discarded and not counted. As discussed herein, the value of B may be adjusted by a calibration factor prior to determining the total charge and identifying if the event is to be counted or not. The value of signal B may be understood as corresponding to the signal induced by a non-collected charge in a given pixel, which is produced by the charge collected in pixel adjacent to the given pixel. The calibration factor is a factor that gives the mathematical relations between the value of B and the amount of charge collected by the adjacent pixel. Accordingly, by knowing the value B and the calibration factor K, the amount of charge collected by the adjacent pixel may be determined.

The various detected or measured values may be determined using shapers. A shaper may be understood as a group of low-pass and high-pass filters producing bandpass filters configured to identify a value at a given frequency or rate (or over a range of frequencies or rates) known as shaping time. For example, in some embodiments, the processing unit 120 is configured to generate a first shaped signal using a first shaper and to determine the collected value A using the first shaped signal. The processing unit 120 may also be configured to generate a second shaped signal using a second shaper, with the second shaper having a higher frequency (shorter shaping time) than the first shaper. The processing unit 120 may determine the combined value using the second shaped signal. The first shaper may also be referred to as a standard shaper, as it is used to generate a signal corresponding to a collected charge, and the second shaper may be referred to as a fast shaper, as it used to generate a signal corresponding to an earlier time (or higher frequency) than the collected charge. Similarly, an electronics channel including a standard shaper may be referred to as a standard channel, and an electronics channel including a fast shaper may be referred to as a fast channel.

Figure 4:
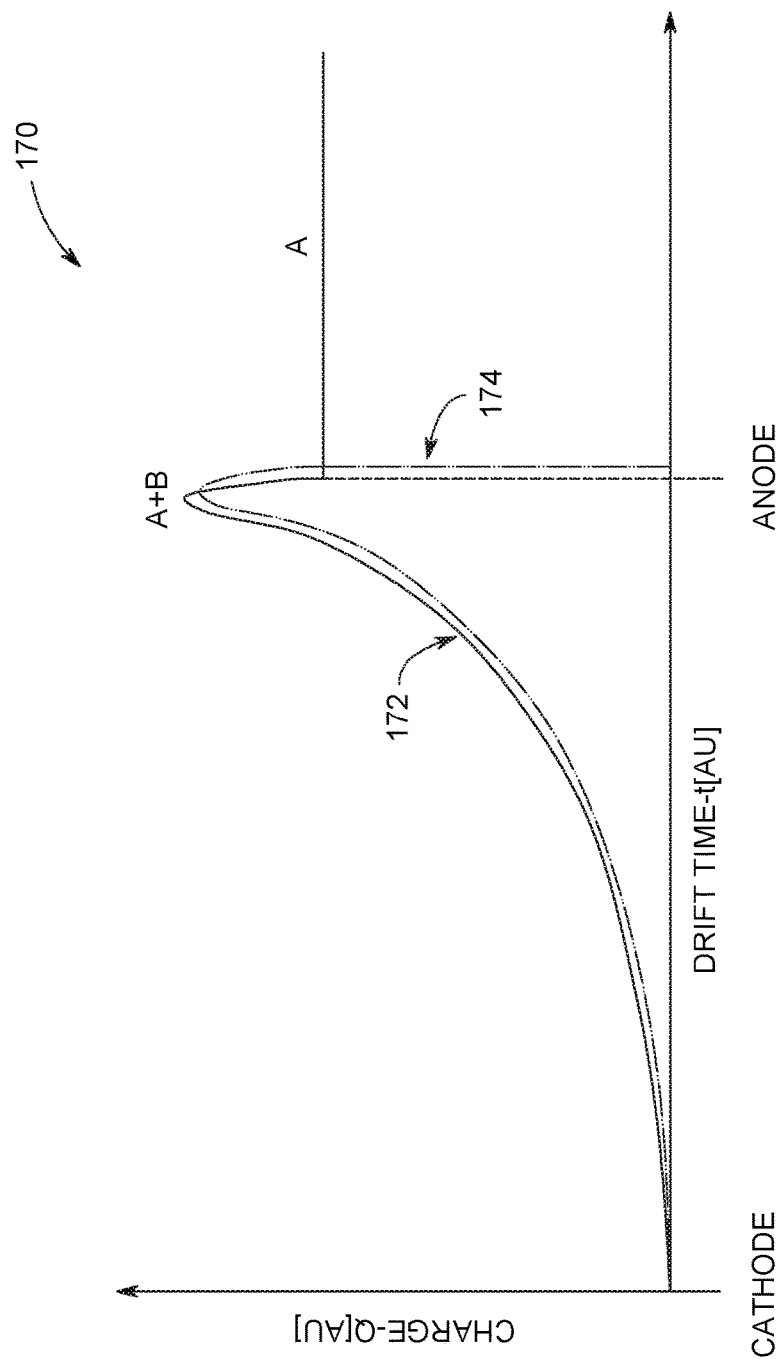
FIG. 4 depicts an example graph of inputs and outputs of a fast shaper in accordance with an embodiment.

FIG. 4 depicts an example graph 170 of inputs and outputs of a fast shaper in accordance with various embodiments. Generally, the fast shaper is configured to provide a signal corresponding to a peak value of the combined charge signal. For example, with an input 172 (e.g., a combined charge signal from a pixelated anode), the fast shaper generates an output 174 that generally corresponds to the combined charge signal up until the time of charge collection, and then drops to or near a zero value. The output 174 may be used, for example, to determine a peak value of the combined signal (A+B).

Figure 5:
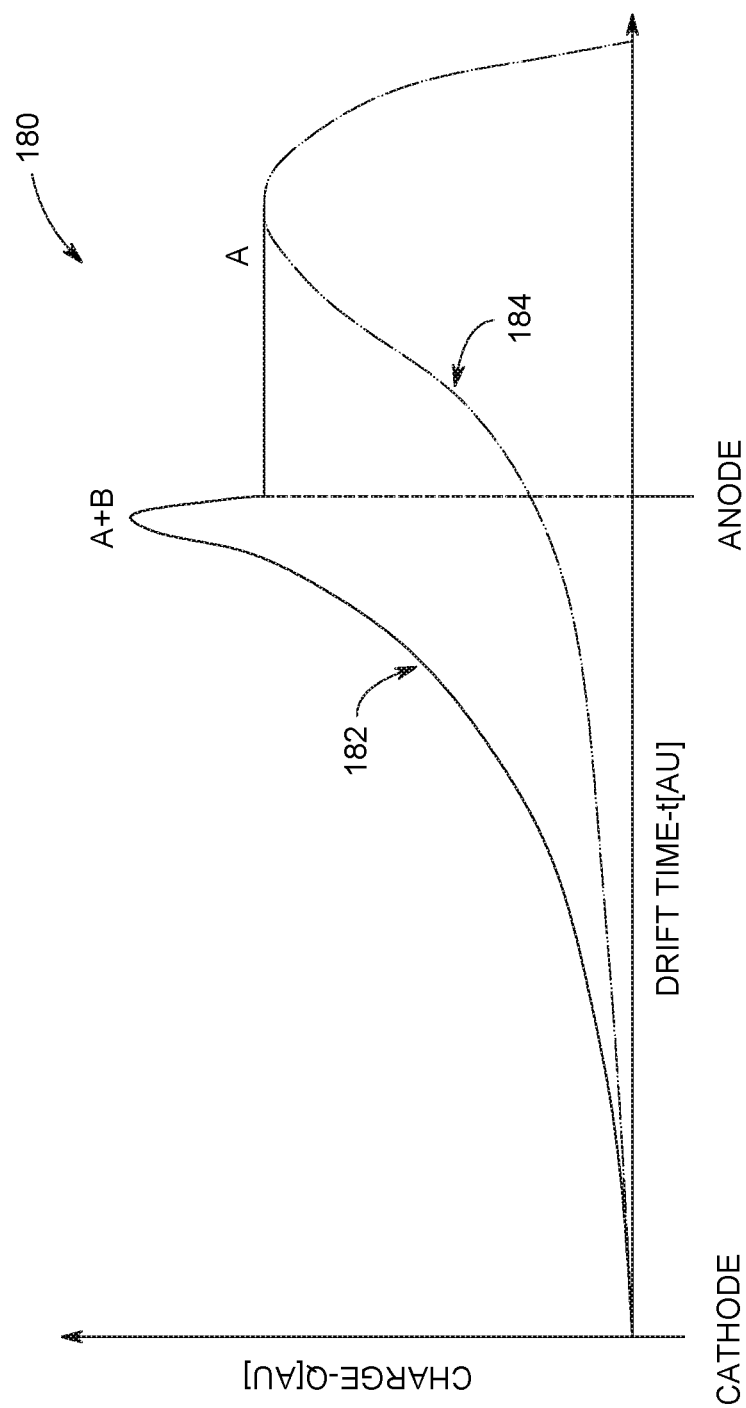
FIG. 5 depicts an example graph of inputs and outputs of a standard shaper in accordance with an embodiment.

FIG. 5 depicts an example graph 180 of inputs and outputs of a standard shaper in accordance with various embodiments. Generally, the standard shaper is configured to provide a signal corresponding to a peak value of the collected charge signal. For example, with an input 182 (e.g., a combined charge signal from a pixelated anode), the standard shaper generates an output 184 that relatively slowly builds to the value of the collected charge signal at a time after charge collection. Accordingly, in the illustrated embodiment, the output 184 corresponds to the collected charge signal A at a late enough drift time such that the contribution of the non-collected charge signal (which has been collected at a previous time by a different pixelated anode) does not contribute to the peak value of the output 184. The output 184 may be used, for example, to determine a peak value of the collected charge signal.

Figure 6:
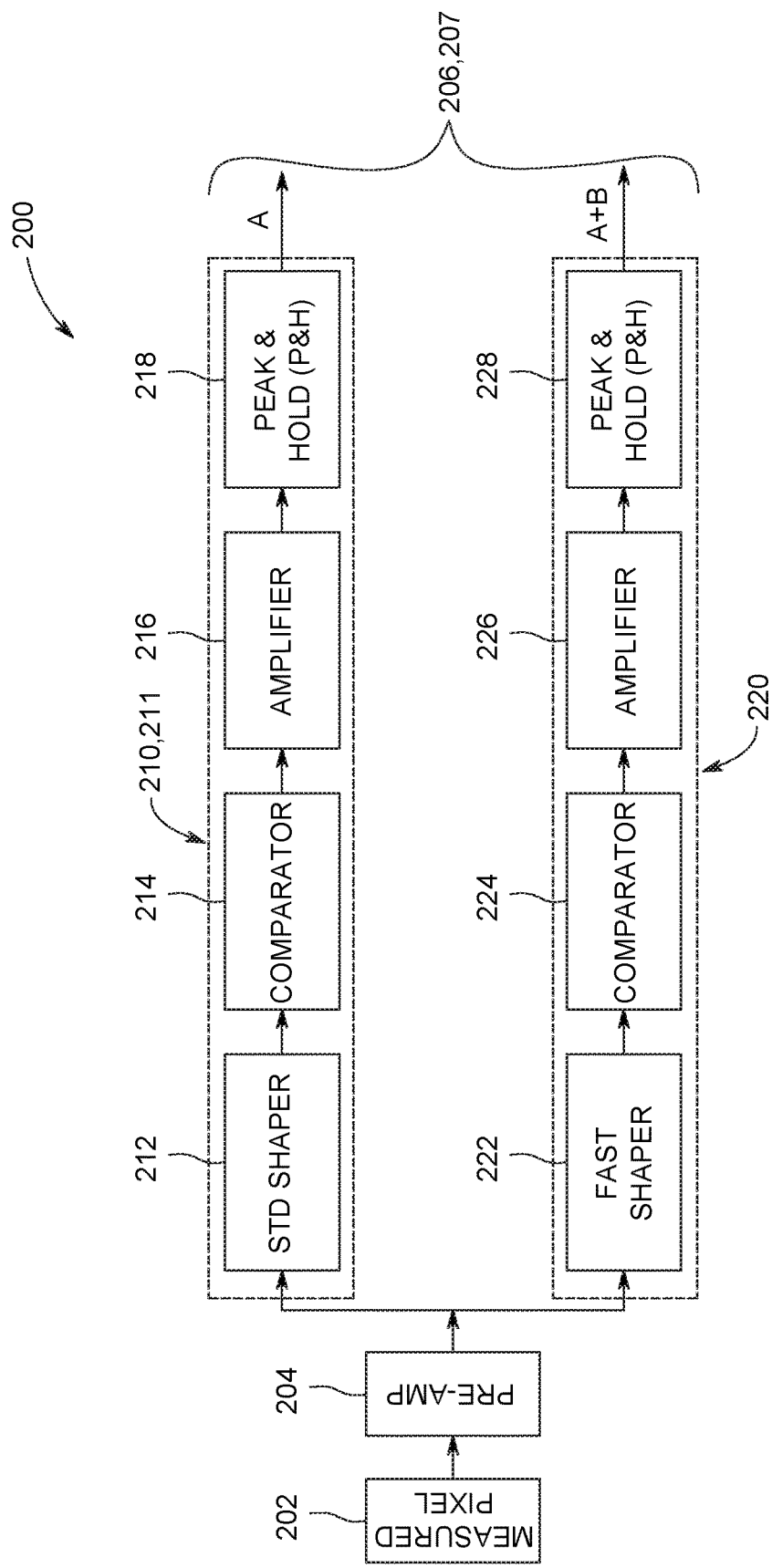
FIG. 6 illustrates a schematic view of a block diagram of a detection system in accordance with an embodiment.

FIG. 6 illustrates a schematic view of a block diagram of a detection system 200 in accordance with various embodiments. The detection system 200 includes a measured pixel 202, a pre-amp 204, and an electronics channel 206 corresponding to the measured pixel 202. While a single pixel 202 and electronics channel 206 are depicted in FIG. 6 for ease and clarity of illustration, it may be noted that a number of pixels 202 may each have an assigned or uniquely corresponding electronics channel 206. The electronics channel 206 may be a portion or aspect of the processing unit 120. In some embodiments, the electronics channel 206 may be a portion or aspect of an ASIC of the on-board portion 121 of the processing unit 120. Generally, the measured pixel 202 provides a combined charge signal (e.g., 156, 166) to the electronics channel 206 via the pre-amp 204.

The depicted electronics channel 206 in turn includes two parallel channels—a standard channel 210 and a fast channel 220. Generally, the standard channel 210 is configured to determine a collected charge value (e.g., a peak value for the collected charge signal 152, 162), and the fast channel 220 is configured to determine a combined charge value (e.g., a peak value for the combined signal 156, 166). Generally, a standard shaper may be used to derive a value (or values) A for the collected charge signal, and a fast shaper used to derive a value (or values) A+B for the combined signal. Then, the value (or values) B of the non-collected signal may be determined by subtracting the determined value A from the determined combined value A+B.

As seen in FIG. 6, the standard channel 210 includes a standard shaper 212, a comparator 214, an amplifier 216, and a peak and hold module 218 connected in series. Generally, the standard shaper 212 receives the combined charge signal from the measured pixel 202 and provides an output (e.g., output 184 of FIG. 5) corresponding to a peak value of the collected charge signal portion A of the combined charge signal. The comparator 214, amplifier 216, and peak and hold module 218 perform additional processing to identify the peak value from the output of the standard shaper 212.

Similarly, the fast channel 220 includes a fast shaper 222, a comparator 224, an amplifier 226, and a peak and hold module 228 connected in series. Generally, the fast shaper 222 receives the combined charge signal from the measured pixel 202 and provides an output (e.g., output 174 of FIG. 4) corresponding to a peak value of the combined charge signal (A+B). The comparator 224, amplifier 226, and peak and hold module 228 perform additional processing to identify the peak value from the output of the fast shaper 222.

Figure 7:
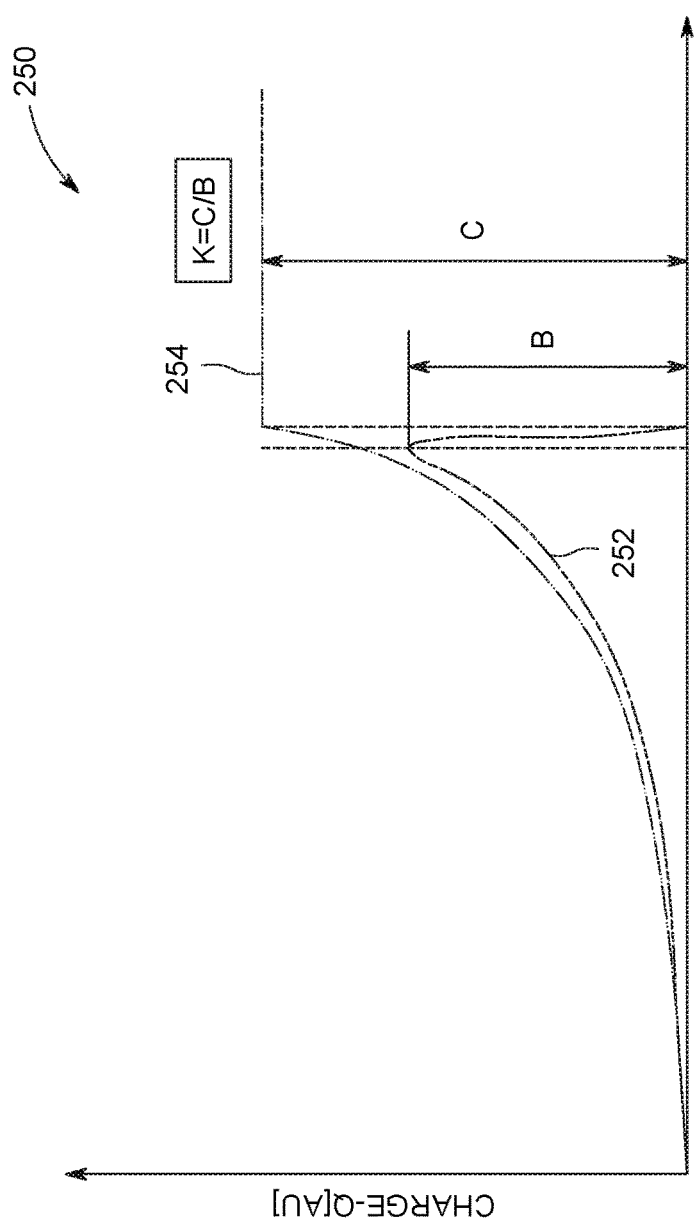
FIG. 7 illustrates a schematic view of two signals used to derive the calibration factor K, which are acquired from two adjacent anodes under the condition that one of them is a collecting charge anode and the other one is a non-collecting charge anode.

In some embodiments, the processing unit 120 may be configured to determine the non-collected value using a calibration factor to adjust the non-collected value to a calibrated value. FIG. 7 provides an example graph 250 depicting determination of a calibration factor in accordance with various embodiments. Two signals are shown plotted against drift time in the graph 250—a non-collected charge signal 252 of a first pixel, and a collected charge signal 254 of a second pixel that is adjacent to the first pixel. To provide the signals shown in the graph 250, the charge sharing line between the first and second pixels is irradiated with a known, calibrated radiation source that is collimated into a small radiation spot. For example, the radiation spot may be aligned on the detector to generate charge clouds in the vicinity of the charge sharing line of the detector in a way that the charge clouds are generated close to the charge sharing line of the detector but without being shared between pixels. This configuration is similar to the situation shown in FIG. 3 with the exception that portion A of the charge cloud is equal to zero and portion B of the charge cloud is equal to the whole cloud. In this case, pixel 116 does not collect charge at all and pixel 117 collects all the charge of the charge cloud. In this situation the signal that is developed on pixel 116 is signal 252 of FIG. 7 corresponding to the signal generated by non-collecting charge. Signal 254 is produced at pixels 117 by the collected charge of the whole cloud. Signals 252 and 254, which are signals B and A of pixels 116 and 117 of FIG. 3, respectively, may be derived by the method mentioned above. The calibration factor K of FIG. 7 that is equal to CB may be understood as being equal to A/B as derived from pixels 117 and 116, respectively.

Alternatively, using similar methodology to that mentioned above but with the charge cloud split evenly between adjacent pixels, the value B in one of the adjacent pixels may be derived using the values (A+B) and A from the fast and standard channels (shapers) in one of the adjacent pixels. The calibration factor K of FIG. 7 is K=C/B. Since the charge cloud is split evenly between the adjacent pixels the value C in the adjacent pixel is equal to the value A in both of the pixels. Thus, K=C/B is equal to K=A/B for such a case. Accordingly, the value A may be derived from the standard shaper in the same pixel in which the value B is derived or in the other adjacent pixel. The value A is the same for both pixels, and thus may be derived from either one of the adjacent pixels.

Theoretically, with the charge evenly divided, the non-collected charge signal 252 and the collected charge signal 254 should have similar values until at or near the time of charge collection. However, in practice, the non-collected charge signal 252 will be smaller and will not reach the peak value of the collected charge signal 254. Accordingly, to help adjust the non-collected charge signal 252 to a higher value more representative of the actual amount of charge that is not collected for a shared charge event, a calibration factor K may be determined. In the illustrated embodiment, K is determined by dividing the peak value C of the collected charge signal 254 by the peak value B of the non-collected charge signal 252. The peak value B of the non-collected charge signal 252 may be determined using a fast channel of the first pixel (the non-collecting pixel) and the peak value C of the collected charge signal 254 may be determined using a standard channel of the second pixel (the collecting pixel). When the charge is evenly shared, the adjusted value (B*K) of the non-collected signal will equal the value C of the collected signal.

Accordingly, by determining the values of signals A and B, and utilizing the calibration factor K, the total energy or total charge of the sharing event may be corrected by a single pixel to be A+K*B, which corresponds to or represents the total charge in the case of charge sharing event collected by two adjacent pixels. In various embodiments, when the value A+K*B exceeds a threshold value (e.g., exceeds the value needed for imaging), the shared event is counted as a single event produced at only one of the adjacent pixels.

In other embodiments, other techniques may be employed to determine the calibration factor. For example, K may be determined separately for differing proportions of shared charge (e.g., a first value K1 for a calibrated radiation event providing 10% of the charge to the non-collecting pixel, a second value K2 for a calibrated radiation event providing 33% of the charge to the non-collecting pixel, and a third value K3 for a calibrated radiation event providing 50% of the charge to the non-collecting pixel), with the particular value of K used to adjust the non-collected value selected based on the amplitude of the non-collected value. It may be noted that, in some embodiments, the value of K determined for a single pair of adjacent pixels may be used as an approximation for K for all pixels of a given detector module. As another example, calibration may be performed for a number of groups of adjacent pixels of a detector module to determine a number of individual K factors which may be averaged or otherwise combined to provide a K factor that may be used for all pixels of the given detector module.

It may be noted that it may be possible for some shared charge events to result in determined collected and non-collected charge signals for each of the adjacent pixels of a shared charge event. In various embodiments, various techniques may be employed to eliminate or reduce the possibility of redundant counting, or counting a shared event for both of the adjacent pixels of the shared event. For example, in some embodiments, the processing unit 120 is configured to remove redundantly counted events when the strength of the non-collected value exceeds a predetermined value. For example, in some embodiments, the non-collected value (e.g., a peak non-collected value adjusted by a calibration factor) may be compared with the collected value. If the non-collected value exceeds the collected value, it may be determined that the event is more accurately or reliably analyzed using information from the adjacent pixel (for which the collected value for the event will exceed the non-collected value). Accordingly, with the event counted (or otherwise analyzed) via the adjacent pixel, the event may be discarded with respect to the pixel for which the non-collected value exceeds the collected value.

Other techniques may be employed to reduce or eliminate redundant counting of shared charge events. In some embodiments, the pixelated anodes 114 may be organized into an array of a first group 130 of anodes and a second group 132 of anodes as seen in FIG. 2. The first group 130 and the second group 132 may be alternatively interleaved, or arranged like a checkerboard, so that for any adjacent pair of pixelated anodes, one of the anodes will be in the first group 130 and the other will be in the second group 132. The processing unit 120 may then be configured to identify and correct charge-sharing events using various techniques discussed herein for the first group 130, but not for the second group 132. For example, the first group 130 of anodes may be associated with first electronics channels 207 (see FIG. 6) having both a standard channel 210 and a fast channel 220, so that both shared and un-shared charge events may be identified for the first group 130. In contrast, the second group 132 of anodes may be associated with second electronics channels 211 (or, having a standard channel 210 but not a fast channel 220), so that only un-shared charge events may be identified for the second group 132.

In various embodiments, different voltages may be applied to different anodes to shift the location of the charge sharing lines. Generally, increasing the voltage to a given anode relative to an adjacent anode will shift the charge sharing line toward the anode with the lower voltage. By shifting the location of a charge-sharing line to be directly over a pixelated anode, the value of the signal produced by the non-collected charge may be increased, thereby reducing the value of K, and improving accuracy and/or reducing errors associated with the calibration process and/or undetected (or under-detected) non-collected charge.

Figure 8:
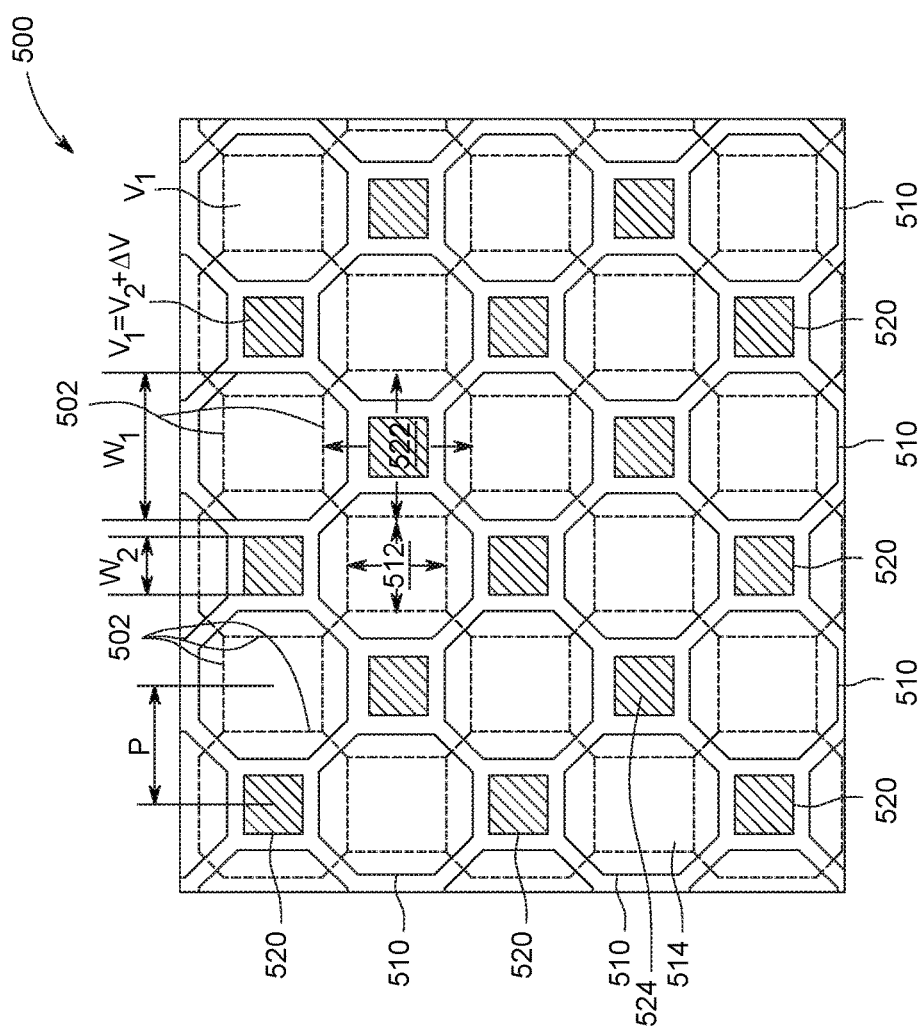
FIG. 8 shows a plan view of a pixelated detector array, according to an embodiment.

FIG. 8 provides a plan view of a detector array 500 formed in accordance with various embodiments. The detector array 500, for example, may be used in connection with the semiconductor detector 110 discussed herein. In the illustrated embodiment, the detector array 500 includes a first group of anodes 510 and a second group of anodes 520. As seen in FIG. 8, the first group of anodes 510 and the second group of anodes 520 are separated by a pitch P. The first group of anodes 510 has a width W1, and the second group of anodes has a width W2. Also, the first group of anodes 510 is provided with a voltage V1, while the second group of anodes is provided with a voltage V2 that is greater than V1 by ΔV. As seen in FIG. 8, because the voltage V2 of the second group of anodes 520 is greater than the voltage V1 of the first group of anodes 510, charge sharing lines 502 between the pixelated anodes do not coincide with the physical boundaries or outlines of the anodes, but instead are shifted to increase the charge collection area 522 of the second group of anodes 520 relative to the physical area of the second group of anodes 520, and to reduce the charge collection area 512 of the first group of anodes 510. With the charge sharing lines 502 shifted as shown in FIG. 8, the charge-sharing lines 502 are positioned within boundaries defined by the first group of anodes 510 (e.g., generally within the octagons defined by the first group of anodes 510), but not within boundaries defined by the second group of anodes 520 (e.g., not within the squares defined by the second group of anodes 520). By shifting the charge-sharing lines 502 so that at least a portion of the charge-sharing lines are positioned within the boundaries of the first group of anodes 510 (in contrast to being positioned on the dividing lines or gaps between the adjacent anodes), the non-collected charge signal (e.g., non-collected charge signal 152, 162 of FIG. 3) generated by the first group of anodes 510 is increased, thereby reducing K and improving accuracy.

Further still, by appropriately adjusting or matching the differences in voltage between the first group of anodes 510 and the second group of anodes 520 with the differences in surface area between the first group of anodes 510 and the second group of anodes 520, the same voxel size or collection area may be provided for both groups of anodes. In the illustrated embodiment, the charge-sharing lines 502 are shown providing a slightly larger collection area 522 for the second group of anodes 520; however, by reducing ΔV, the charge-sharing lines may be shifted to reduce the collection area 522 and to increase the collection area 512 to provide evenly sized (or nearly evenly sized) collection areas.

In the illustrated embodiment, the first group of anodes 510 define a first surface area 514 and the second group of anodes define a second surface area 524. The first surface area 514 is larger than the second surface area 524, while the second voltage V2 is greater than the first voltage V1. Accordingly, the charge-sharing lines may be shifted to be positioned under the first group of anodes 510 or within boundaries defined by the first group of anodes 510, while maintaining evenly sized collection areas for both groups of anodes. In the illustrated embodiment, the first surface area 514 corresponds to an octagonal shape and the second surface area 524 corresponds to a square shape. Use of octagons and squares in various embodiments provides for efficient placing of alternately sized pixelated anodes in a 2-dimensional array.

Further, in the illustrated embodiment, for example, with reduced calibration factors for the first group of anodes 510, the processing unit 120 (shown in FIG. 1) may be configured to identify charge sharing events for the first group of anodes 510 but not for the second group of anodes 520. For example, the first group of anodes 510 may be associated with first electronics channels 207 (shown in FIG. 6) having both a standard channel 210 and a fast channel 220, so that both shared and un-shared charge events may be identified and corrected for the first group of anodes 510. In contrast, the second group of anodes 520 may be associated with second electronics channels 211 (or, having a standard channel 210 but not a fast channel 220), so that only un-shared charge events may be identified and processed for the second group of anodes 520.

Figure 9:
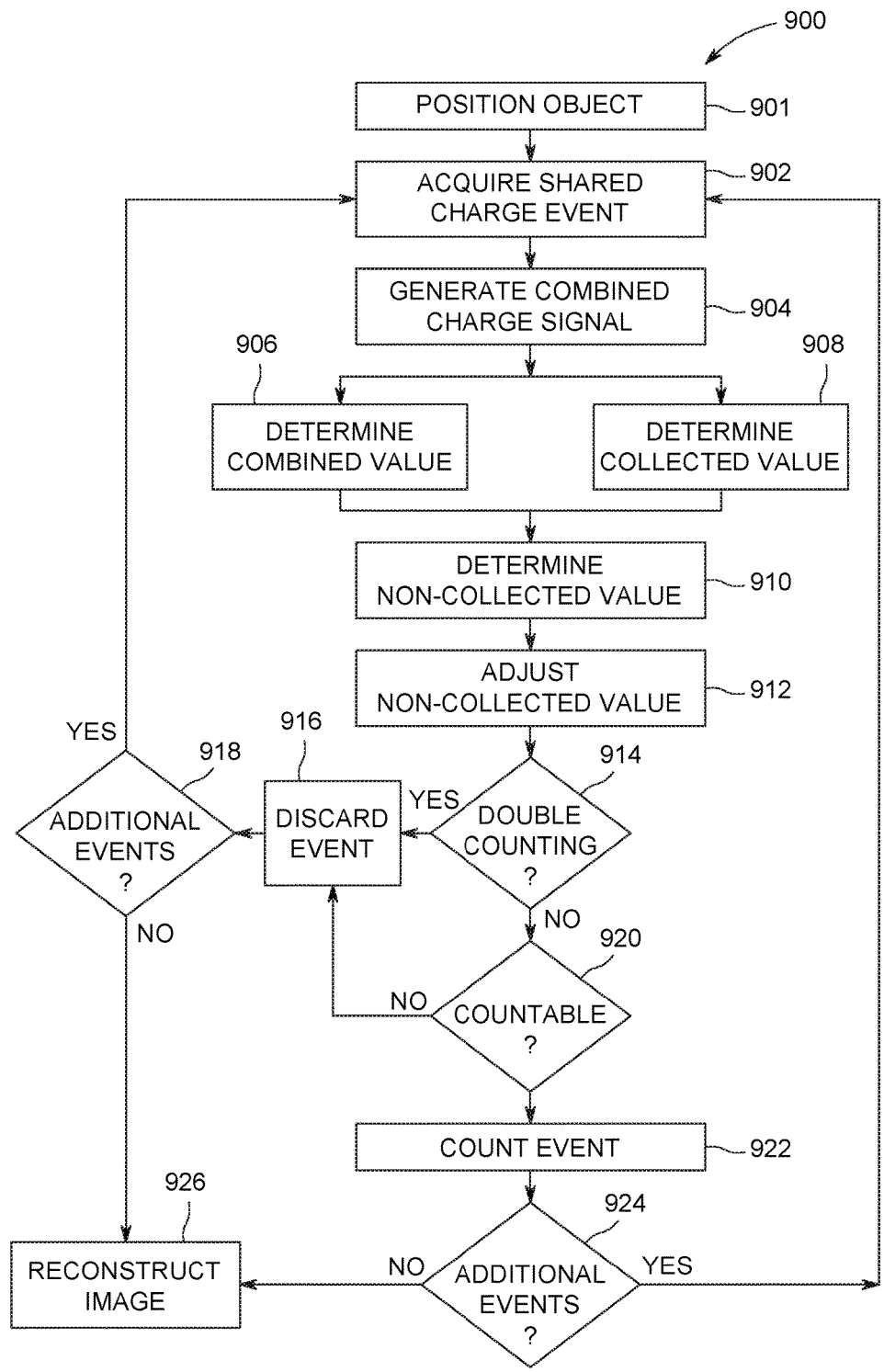
FIG. 9 shows a flowchart of a method, according to an embodiment.

FIG. 9 provides a flowchart of a method 900 for imaging including detection of shared-charge events, in accordance with various embodiments. The method 900, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 900 may be able to be used as one or more algorithms to direct hardware (e.g., one or more aspects of the processing unit 120 of FIG. 1) to perform one or more operations described herein. For ease of description, aspects of the method 900 are described herein with reference to a single pixel or single pair of adjacent pixels. The general principles may be applied to multiple pixels or pairs of adjacent pixels of a detector system.

At 901, an object to be imaged is positioned proximate a detector system. The object may be for example, a human patient or a portion thereof that has been administered a radiopharmaceutical. Radiation emitted from the patient may be detected by the detector system to provide information from which a nuclear medicine image (e.g., a PET image, a SPECT image, a NM image) is to be reconstructed.

At 902, at least one shared charge event is acquired by a radiation detector of the detector system that includes plural pixelated anodes disposed on a surface of the detector. A shared charge event may be understood as an event (e.g., photon impact) that results in generation and collection of an electron cloud in the detector for which the charge is shared between adjacent pixelated anodes. A portion of the shared charge event is collected by one anode while another portion of the shared event is collected by an adjacent anode. Because the portion of the charge collected by either pixel may not be large enough to be identified on its own as an event to be counted, additional analysis may be required to identify the event as an event to be counted. In the illustrated embodiment, the additional analysis may be performed using only information from a single pixel, as discussed herein.

At 904, a combined charge signal is generated by a pixel of the detector system experiencing a shared charge event (e.g., a charge generated responsive to photon impact having a portion of the charge detected by the pixel and a portion of the charge collected by an adjacent pixel). The combined charge signal includes or is formed of a collected charge signal corresponding to charge collected by a given anode and a non-collected charge signal corresponding to charge collected by an adjacent anode (but detected by the given anode before collection by the adjacent anode).

At 906, a combined value for the collected charge signal and the non-collected charge signal is determined. For example, because the value of the non-collected charge goes to zero at or near the time of charge collection, the combined value may be determined using a fast shaper configured to capture or determine a peak value of the combined signal before the time of charge collection.

At 908, a collected value is determined for the collected charge signal. For example, because the value of the non-collected charge goes to zero at or near the time of charge collection, the collected charge signal will have a longer duration and may be determined by examining the signal output from the pixel at a time after the time of charge collection. The value of the signal produced by the collected charge may be determined using a standard shaper configured to capture or determine a peak value of the signal from the pixel after the time of charge collection. In some embodiments, if the collected value is determined to be within an expected range for an un-shared event, the method 900 may proceed directly to 922 and the event may be counted for the pixel without further analysis of the combined and/or non-collected values.

At 910, a non-collected value for the non-collected charge signal is determined. For example, a peak value of the non-collected charge signal may be determined or estimated by subtracting the peak value of the collected charge signal determined at 908 from the peak value of the combined charge signal determined at 906.

At 912, the non-collected value determined at 910 is adjusted to a calibrated value using a calibration factor. The calibration factor may be determined as discussed herein, for example using a known radiation amount evenly split between adjacent electrodes and comparing the peak values of signals generated by the adjacent electrodes, with the calibration factor determined using the peak value generated by the collecting anode divided by the peak value generated by the non-collecting anode.

At 914, it is determined if the event resulting in the values of collected and non-collected charge determined at 906-910 or 906-912 is a result of double counting of an event by both the pixelated anode and an adjacent pixelated anode. For example, the non-collected value may be compared to a predetermined value, and if the non-collected value exceeds the predetermined value, the corresponding event may be discarded or removed. The predetermined value may define or correspond to a value at which it is likely that a larger proportion of the charge from an electron cloud of the shared charge event is collected by an adjacent pixel instead of the immediate pixel, and thus that the shared charge event may be more reliably or accurately analyzed using information from the adjacent pixel instead of the immediate pixel. The predetermined value, for example, may be the value of the collected charge determined for the same event. The predetermined value, as another example, may be one-half of the expected value for an un-shared charge. It may be noted that, for embodiments in which both collected and non-collected values are considered for only one member of a pair of adjacent electrodes (with only collected values considered for the other member of the pair), the likelihood of counting of redundant events may be reduced or eliminated without performance of step 914. For example, in embodiments where charge-sharing events are only identified for every other pixel (e.g., charge-sharing events are identified for a first group of pixels but not for a second group of pixels, with the first and second groups arranged in an alternating or checkerboard fashion.

If the event is a result of double-counting, the method 900 proceeds to 916, and the event is removed, discarded, or otherwise not counted. At 918, it is determined if there are additional events to be analyzed. If there are additional events for analysis, the method 900 proceeds to 902. If there are no additional events, the method proceeds to 926.

If the event is not the result of double counting, the method 900 proceeds to 920. At 920 it is determined if the event corresponds to a countable event (e.g., photon impact). A charge sharing event between a given anode and adjacent anode may be identified and corrected using the collected value and the non-collected value (e.g., adjusted non-collected value determined at 912) to provide the total charge of the charge sharing event distributed between two adjacent pixels. In various embodiments, if the sum of the collected value and the adjusted non-collected value is within a range corresponding to a countable event, or if the total charge produced by a charge sharing event is otherwise calculated to exceed a predetermined value, the event may be counted. If the event is determined to be a non-countable event, the method proceeds to 916. If the sum is within the range, however, the event may be identified as a charge sharing event, and the method may proceed to 922.

At 922, the event is counted. At 924 it is determined if there are additional events to be analyzed. If there are additional events for analysis, the method 900 proceeds to 902. If there are no additional events, the method proceeds to 926. At 926, all counted events for all pixels are used to reconstruct an image.

Various embodiments discussed herein provide for the identification of a shared charge event using information from only one pixelated anode instead of information from both pixelated anodes sharing the event. Accordingly, noise is reduced, as only noise from one of the pixels instead of noise from both of the pixels may affect an analyzed signal. Further, because the non-collected signal is measured or detected along with the collected signal, even small non-collected signals may pass the threshold level along with the collected signal, providing more information regarding charge-sharing events. Further still, because only information from one pixel is utilized, there is no need for time-coincidence analysis and verification of signals from two different pixels, nor any need to perform summing or mapping of neighboring pixels to identify a charge sharing event. Further, surface-recombination loss is reduced or eliminated in various embodiments. Additionally, with the signal analyzed being generated by a single pixel, the analysis is not affected by signals of adjacent pixels include random coincidence signals. Also, various embodiments may be more easily implemented inside an ASIC of a detector, as computational requirements are reduced (for example, by not requiring analysis of time-coincidence of signals from adjacent pixels).

Figure 10:
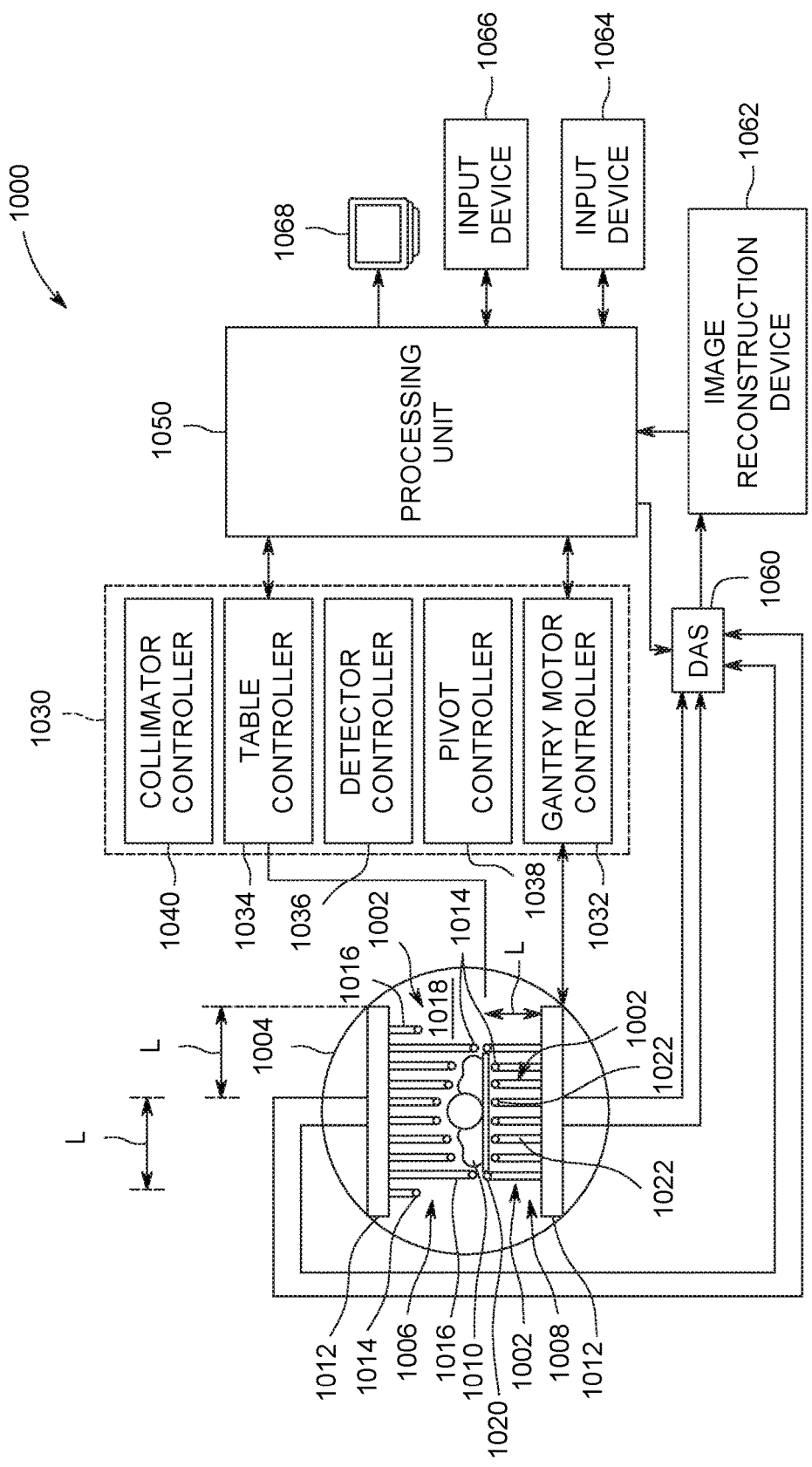
FIG. 10 shows a schematic view of an imaging system, according to an embodiment.

The invention described above and illustrated by the various figures discussed herein may be implemented in medical imaging systems, such as, for example, SPECT, SPECT-CT, PET and PET-CT. Various methods and/or systems (and/or aspects thereof) described herein may be implemented using a medical imaging system. For example, FIG. 10 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 10 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 10. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 9). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) passing through the gantry 1004 as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

The collimators 1022 (and detectors) in FIG. 10 are depicted for ease of illustration as single collimators in each detector head. Optionally, for embodiments employing one or more parallel-hole collimators, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 10). In various embodiments, the detector controller 1036 may control the detector carriers 1016 or the support members 1012 to move in different lateral directions. Detector controller 1036 may control the swiveling motion of detectors 1002 together with their collimators 1022. In some embodiments, detectors 1002 and collimators 1022 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 9 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

It may be noted that various embodiments discussed herein relate to the treatment of charge sharing events. Additionally or alternatively, various embodiments may also be configured to determine sub-pixel locations for events, for example, when simultaneous events impact adjacent pixels. Generally, sub-pixel locations may be achieved virtually by accurate positioning of events in virtual sub-pixels, which may be used to improve intrinsic resolution and improve energy resolution. Additional discussion regarding sub-pixels may be found, for example, in U.S. patent application Ser. No. 14/627,436, entitled "Systems and Methods for Improving Energy Resolution by Sub-Pixel Energy Calibration," filed 20 Feb. 2015, the entire subject matter of which is incorporated by reference herein.

In various embodiments, a sub-pixel position of an event for a given pixel (e.g., a distance of the sub-pixel position from a center of the pixel) may be expressed, for example, in terms of x, y, and z coordinates. The z-coordinate, for example, may be determined using conventional methods to determine a depth-of-interaction (DOI). X and Y coordinates may be determined, for example, using non-collected signals from the pixels adjacent to the pixel for which a collected signal is obtained. The non-collected signals appear in pixels in which no photon is absorbed during an acquisition time period, with the non-collected signals induced by the moving charge in the pixel in which the photon was absorbed.

Figure 11:
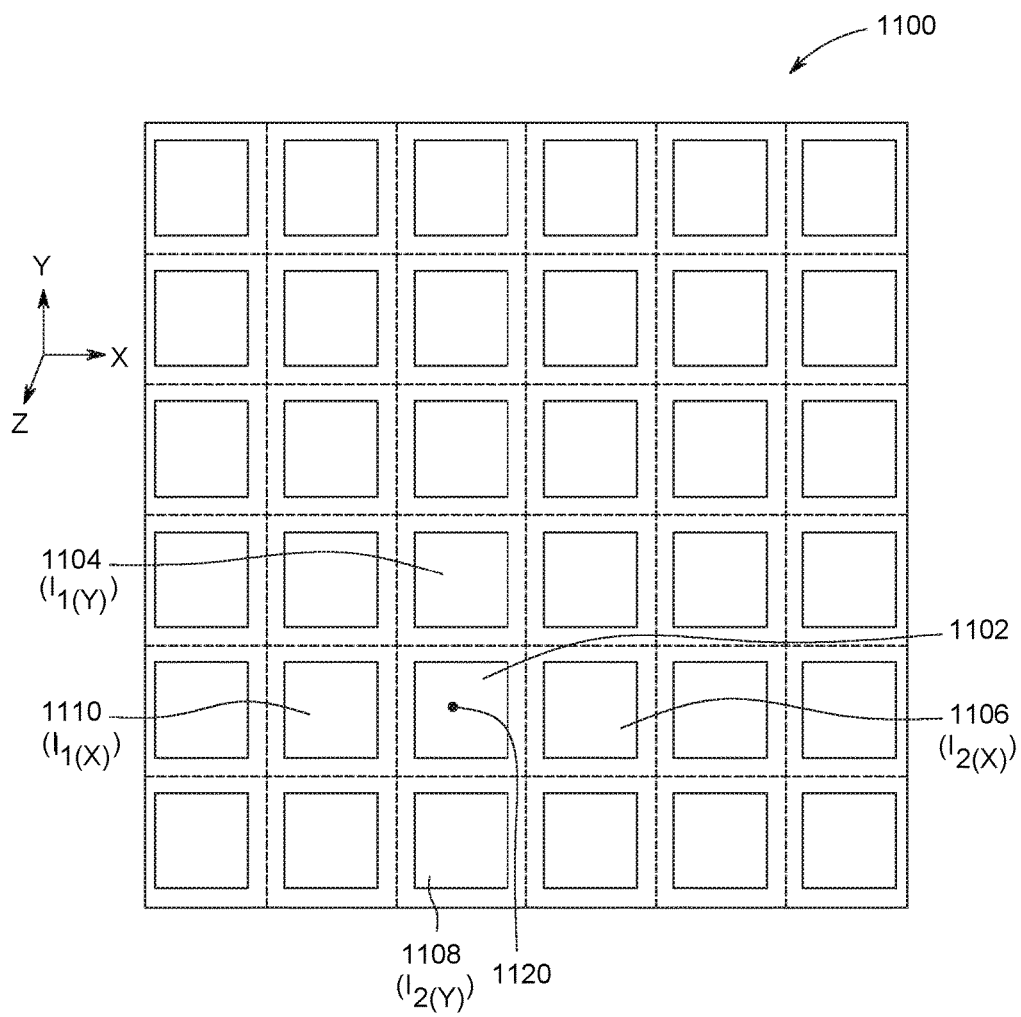
FIG. 11 illustrates an example scenario for which a sub-pixel location may be determined.

In various embodiments, a sub-pixel position of an event for a given pixel may be expressed in terms of a distance from the center of the pixel. FIG. 11 illustrates an example scenario for which a sub-pixel location may be determined. In FIG. 11, a pixelated detector 1100 includes a pixel 1102 which is impacted by a photon resulting in a detected event 1120 that corresponds to a collected signal in the pixel 1102. The pixelated detector 1100 also includes a first adjacent pixel 1104 located immediately above the pixel 1102, a second adjacent pixel 1106 located immediately to the right of the pixel 1102, a third adjacent pixel 1108 located immediately below the pixel 1102, and a fourth adjacent pixel 1110 located immediately to the left of the pixel 1102. Each of the adjacent pixels, 1104, 1106, 1008, 1110 have a corresponding non-collected signal due to the event 1120 which may be used to determine a sub-pixel location for the event 1120. The sub-pixel location ma be determined as a distance from the center of the pixel 1102. For example, in the depicted embodiment, the first adjacent pixel 1104 provides a non-collected signal $I_{1(Y)}$, the second adjacent pixel 1106 provides a non-collected signal $I_{2(X)}$, the third adjacent pixel 1108 provides a non-collected signal $I_{2(Y)}$, and the fourth adjacent pixel 1110 provides a non-collected signal $I_{1(X)}$. Then, the sub-pixel location for the event 1120 may be determined as a distance from the center of the pixel ($\Delta X$, $\Delta Y$), where $\Delta X$ is given by:

$$\Delta X = \frac{I_{1(X)} - I_{2(X)}}{I_{1(X)} + I_{2(X)}} \qquad \text{Eq. 1}$$

with $I_{1(X)}$ and $I_{2(X)}$ the non-collected signals in pixels adjacent to the pixel where the event occurred that are aligned along the X direction. Also, for the depicted example, $\Delta Y$ may be given by;

$$\Delta Y = \frac{I_{1(Y)} - I_{2(Y)}}{I_{1(Y)} + I_{2(Y)}} \qquad \text{Eq. 2}$$

with $I_{1(Y)}$ and $I_{2(Y)}$ the non-collected signals in pixels adjacent to the pixel where the event occurred that are aligned along the Y direction.

However, it may be noted that, in the case where two collected events or two photon impacts occur simultaneously (e.g., within a same event counting Or accumulation period, or within a predetermined, time of each other to be effectively simultaneous), difficulties may arise in determining a non-collected charge occurring in one of the pixels impacted to be used in determining a sub-pixel location for the other of the pixels impacted. It may be noted that such a case of simultaneous events occurring in adjacent pixels has a generally significant probability of occurrence, for example, due to Compton scattering when using a relatively high energy isotope. It may further be noted that the probability for such simultaneous occurrence is even higher when a collimator is not used, for example in a Compton camera.

Figure 12:
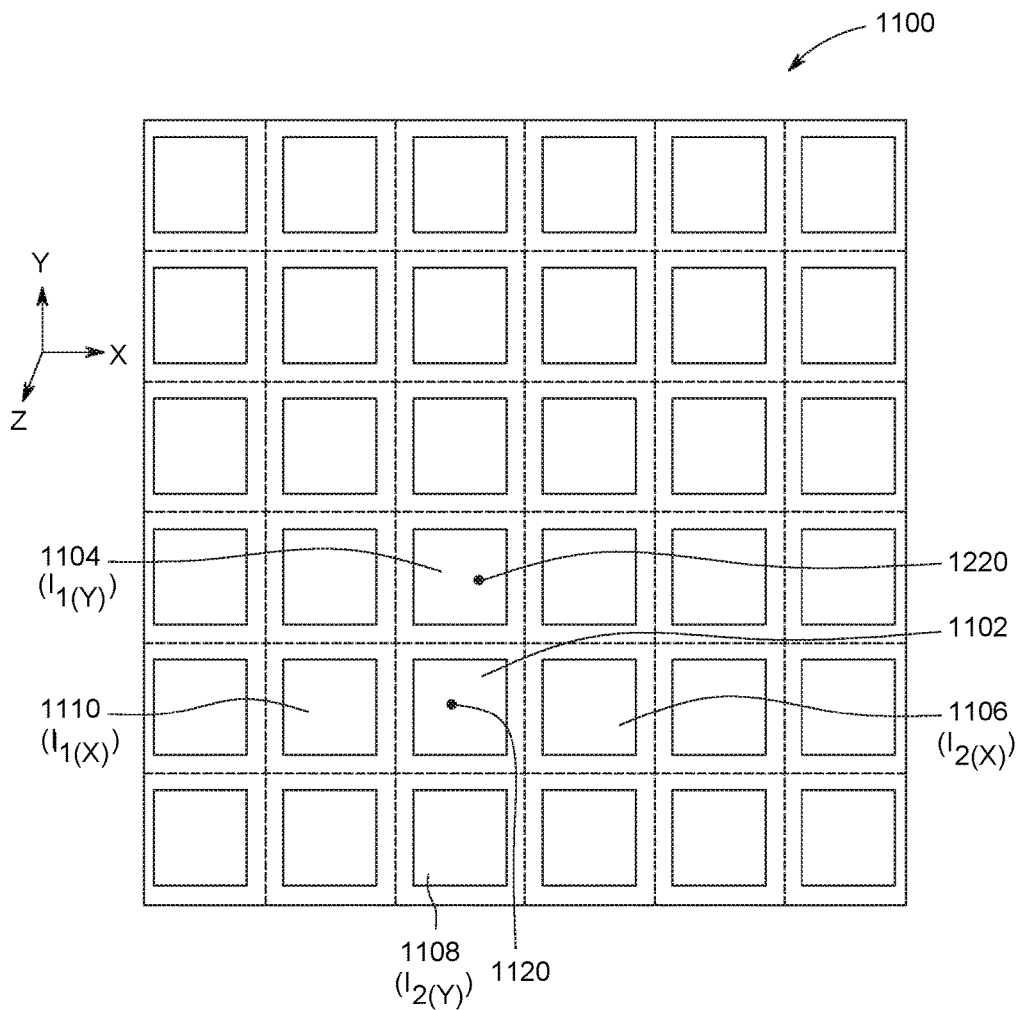
FIG. 12 illustrates an example scenario including events in adjacent pixels for which a sub-pixel location may be determined.

FIG. 12 illustrates an example scenario for the pixels of FIG. 11 for which simultaneous events occur in adjacent pixels. In FIG. 12, in addition to the event 1120 of the pixel 1102, a second event 1220 (e.g., a photon impact) occurs in the first adjacent pixel 1104. Accordingly, a signal obtained from the first adjacent pixel 1104 corresponds to both the second event 1220 and an induced or non-collected signal ($I_{1(Y)}$). Use of such a combined signal as an non-collected signal in Equation 2 from above would result in an accurate sub-pixel location, as the relatively high value due to the combined signal would result in a sub-pixel location that is too close to the first adjacent pixel 1104 (or too far from the third adjacent pixel 1108). Accordingly, in various embodiments, the combined signal is processed to separate the signal due to the second event 1220 in the first adjacent pixel 1104 from the non-collected signal in the first adjacent pixel 1104 induced by the event 1120 in the pixel 1102, or otherwise determine the non-collected signal in the first adjacent pixel 1104 due to the event 1120 in the pixel 1102, and use the non-collected signal from the first adjacent pixel 1104 to determine a sub-pixel location for the event 1120 in the pixel 1102 (e.g., using additional non-collected signals from other adjacent pixels). Techniques generally similar in certain respects to those used in identifying collected and non-collected signal discussed in connection with charge-sharing may also be used in connection with analyzing simultaneous events in adjacent pixels. For example, a standard shaper and a fast shaper may be utilized to acquire a collected signal as well as a combined signal corresponding to a collected signal and a non-collected signal.

For example, with reference to FIG. 1, the processing unit 120 may be configured to determine a collected value for a collected charge signal in a pixelated anode 114 (e.g., pixel 1104 in FIG. 12), and to determine a non-collected value for a non-collected charge signal in the pixelated anode (e.g., pixel 1104) corresponding to a charge collected by an adjacent anode (e.g., pixel 1102 in FIG. 12). In some embodiments, to determine the collected and non-collected values, the processing unit first determines a combined value corresponding to a sum of the collected charge signal and the non-collected charge signal, determines the collected value, and then determines the non-collected value using a difference between the combined value and the collected value.

Figure 13:
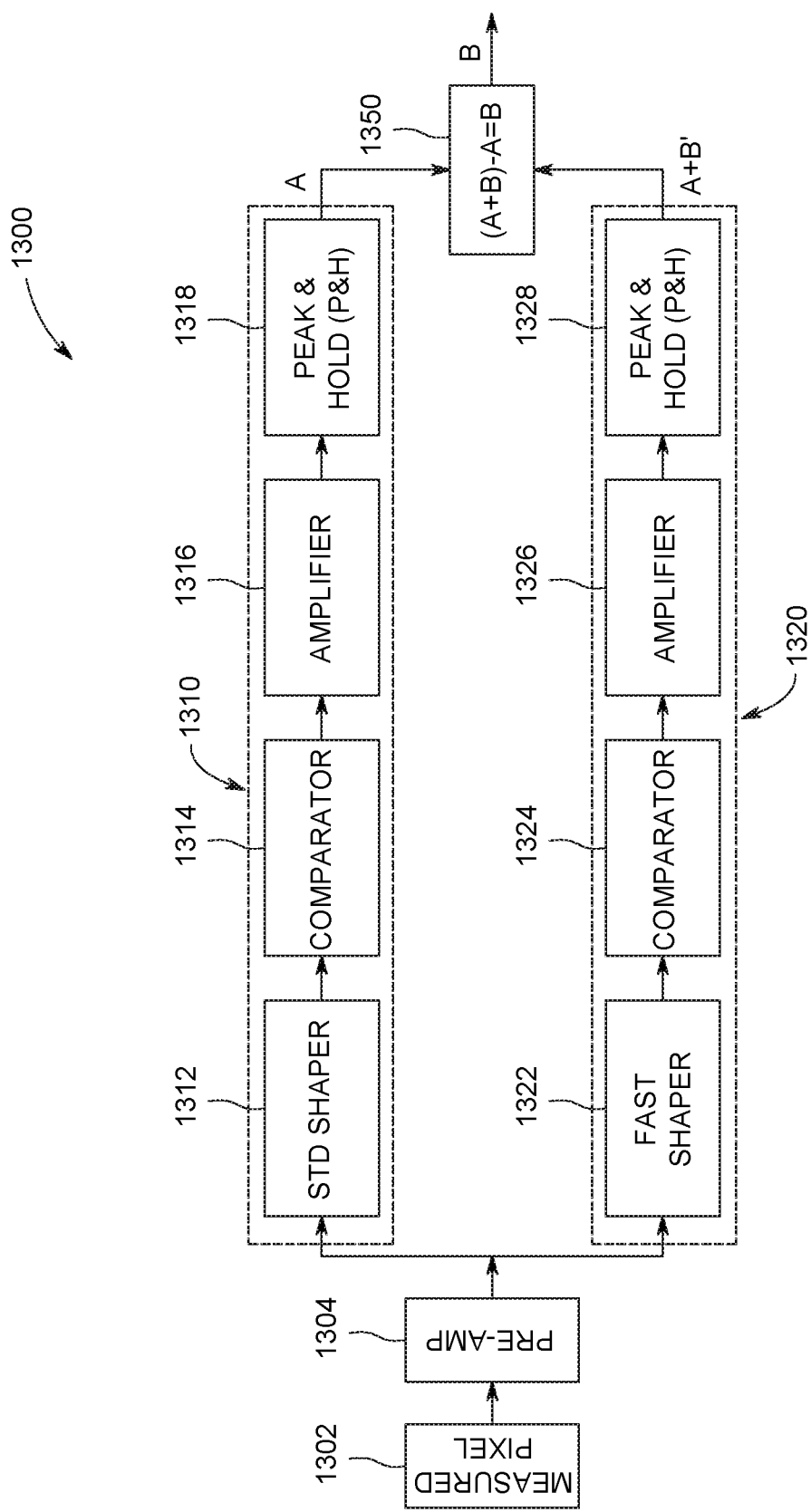
FIG. 13 illustrates a schematic view of a block diagram of a detection system in accordance with an embodiment.

For example, the processing unit 120 may generate a first shaped signal using a first shaper, and determine the collected value using the first shaped signal. The processing unit 120 may also generate a second shaped signal using a second shaper, with the second shaper having a higher frequency than the first shaper, and determine the combined value using the second shaped signal. To determine the non-collected value, the collected value using the first shaped signal may be subtracted from the combined value determined using the second shaped signal. FIG. 13 illustrates a schematic view of a block diagram of an example detection system 1300 configured to use first and second shapers to determine collected and combined charge signals for use in determining sub-pixels locations when simultaneous events occur in adjacent pixels. In various embodiments, one or more aspects of the detection system 1300 may be generally similar in certain respects to one or more aspects of the detection system 200 discussed in connection with FIG. 6.

As seen in FIG. 13, the detection system 1300 includes a measured pixel 1302, a pre-amp 1304, and an electronics channel 1306 corresponding to the measured pixel 1302. As with FIG. 6, while a single pixel 1302 and electronics channel 1306 are depicted in FIG. 13 for ease and clarity of illustration, it may be noted that a number of pixels 1302 of a given detection system may each have an assigned or uniquely corresponding electronics channel 1306. The electronics channel 1306 (as well as electronics channels for additional pixels) may be a portion or aspect of the processing unit 120, for example. In some embodiments, the electronics channel 1306 may be a portion or aspect of an ASIC of the on-board portion 121 of the processing unit 120. Generally, the measured pixel 1302 provides a combined charge signal (e.g., including a collected charge signal for an event within the measured pixel 1302 along with a non-collected charge signal induced by an event within a pixel adjacent to the measured pixel 1302) to the electronics channel 1306 via the pre-amp 1304.

The depicted electronics channel 1306 in turn includes two parallel channels—a standard channel 1310 and a fast channel 1320. Generally, the standard channel 1310 is configured to determine a collected charge value (e.g., a peak value for a collected charge signal), and the fast channel 1320 is configured to determine a combined charge value (e.g., a peak value for a combined signal). Generally, a standard shaper may be used to derive a value (or values) A for the collected charge signal, and a fast shaper used to derive a value (or values) A+B for the combined signal. Then, the value (or values) B of the non-collected signal may be determined by subtracting the determined value A from the determined combined value A+B.

As seen in FIG. 13, the standard channel 1310 includes a standard shaper 1312, a comparator 1314, an amplifier 1316, and a peak and hold module 1318 connected in series. Generally, the standard shaper 1312 receives the combined charge signal from the measured pixel 1302 and provides an output corresponding to a peak value of the collected charge signal portion A of the combined charge signal. The comparator 1314, amplifier 1316, and peak and hold module 1318 perform additional processing to identify the peak value from the output of the standard shaper 1312.

Similarly, the fast channel 1320 includes a fast shaper 1322, a comparator 1324, an amplifier 1326, and a peak and hold module 1328 connected in series. Generally, the fast shaper 1322 receives the combined charge signal from the measured pixel 1302 and provides an output corresponding to a peak value of the combined charge signal (A+B). The comparator 1324, amplifier 1326, and peak and hold module 1328 perform additional processing to identify the peak value from the output of the fast shaper 1322.

The detection system 1300 also includes non-collected charge determination block 1350, which, for example, may reside within the processing unit 120. The non-collected charge determination block 1350 receives, as inputs, a collected charge signal value (represented as A in FIG. 13) and a combined charge signal value (represented as A+B in FIG. 13), and subtracts the collected charge signal value from the combined charge signal value to provide an output of the non-collected charge signal value (represented as B in FIG. 13). The non-collected charge signal value may then be utilized to determine a sub-pixel location for an event that occurred in a pixel adjacent to the measured pixel 1302. It may be noted that the detection system 1300 may also be configured to perform determinations regarding charge sharing as discussed herein. For example, a processing unit 120 may be configured to determine if acquired signals from one or more pixels correspond to charge-sharing, or instead correspond to simultaneous events in adjacent pixels. If the acquired signals correspond to charge-sharing, the detection system 1300 may be used in connection with charge-sharing determinations (e.g., as discussed in connection with FIGS. 6 and 9). If, however, the acquired signals correspond to simultaneous events in adjacent pixels, the detection system 1300 may be used in connection with simultaneous event determinations (e.g., as discussed in connection with FIGS. 12-14).

With the collected value and the non-collected value for a given pixel (e.g., first adjacent pixel 1104 that has been impacted by event 1220) determined, events may be counted. For example, the processing unit 120 may use the non-collected value for the non-collected charge signal of the first adjacent pixel 1104 to determine a sub-pixel location for the adjacent anode (e.g., the non-collected value for the first adjacent pixel 1104 may be used to determine a sub-pixel location for the event 1120 of the pixel 1102). For example, non-collected charge signals for a group of adjacent pixels may be used to determine a sub-pixel location using Equations 1 and 2 discussed herein. Also, the processing unit 120 may use the collected charge signal due to the second event 1220 of the first adjacent pixel 1104 to count a single event for the first adjacent pixel 1104. It may be noted that non-collected charge values from pixels adjacent to the first adjacent pixel 1104 may be used to determine a sub-pixel location for the second event 1220 within the first adjacent pixel 1104. It may further be noted that a collected charge and a non-collected charge for the pixel 1102 may be separately determined to determine the sub-pixel location for the second event 1220 within the first adjacent pixel 1104.

As discussed herein, in various embodiments, both charge-sharing events and simultaneous events in adjacent pixels may be analyzed using determinations of collected charge values, combined charge values, and non-collected charge values. For example, in some embodiments, the processing unit 120 is configured to determine if the collected charge signal for a given pixel corresponds to a charge sharing event or to simultaneous collected events in the pixel and an adjacent pixel. The processing unit 120 in various embodiments is configured to determine if the collected charge signal corresponds to a charge sharing event for a given pixel or simultaneous events for the pixel and an adjacent pixel based on at least one energy level of one detected event.

For example, if the collected charge signal from a pixelated anode (e.g., first adjacent pixel 1104) and the collected charge signal from an adjacent anode (e.g., pixel 1102) both correspond to a nominal event, the processing unit 120 in various embodiments determines that the collected charge signal corresponds to a simultaneous collected event. For instance, if the collected charge signal from each of two adjacent pixels is at or near a predetermined peak energy level of an isotope used for a scanning process resulting in the collected charge, the events may be characterized as simultaneous events in the adjacent pixels.

However, as another example, if a sum of the collected charge signal from a pixelated anode (e.g., first adjacent pixel 1104) and a collected charge signal from an adjacent anode (e.g., pixel 1102) corresponds to a nominal event energy level, the processing unit 120 in various embodiments determines that the collected charge signal corresponds to a charge sharing event. For example, if the sum is within a predetermined threshold range of a peak energy level of an isotope used for a scanning process resulting in the collected charge, the collected charge signal may be determined to correspond to a charge sharing event.

Figure 14:
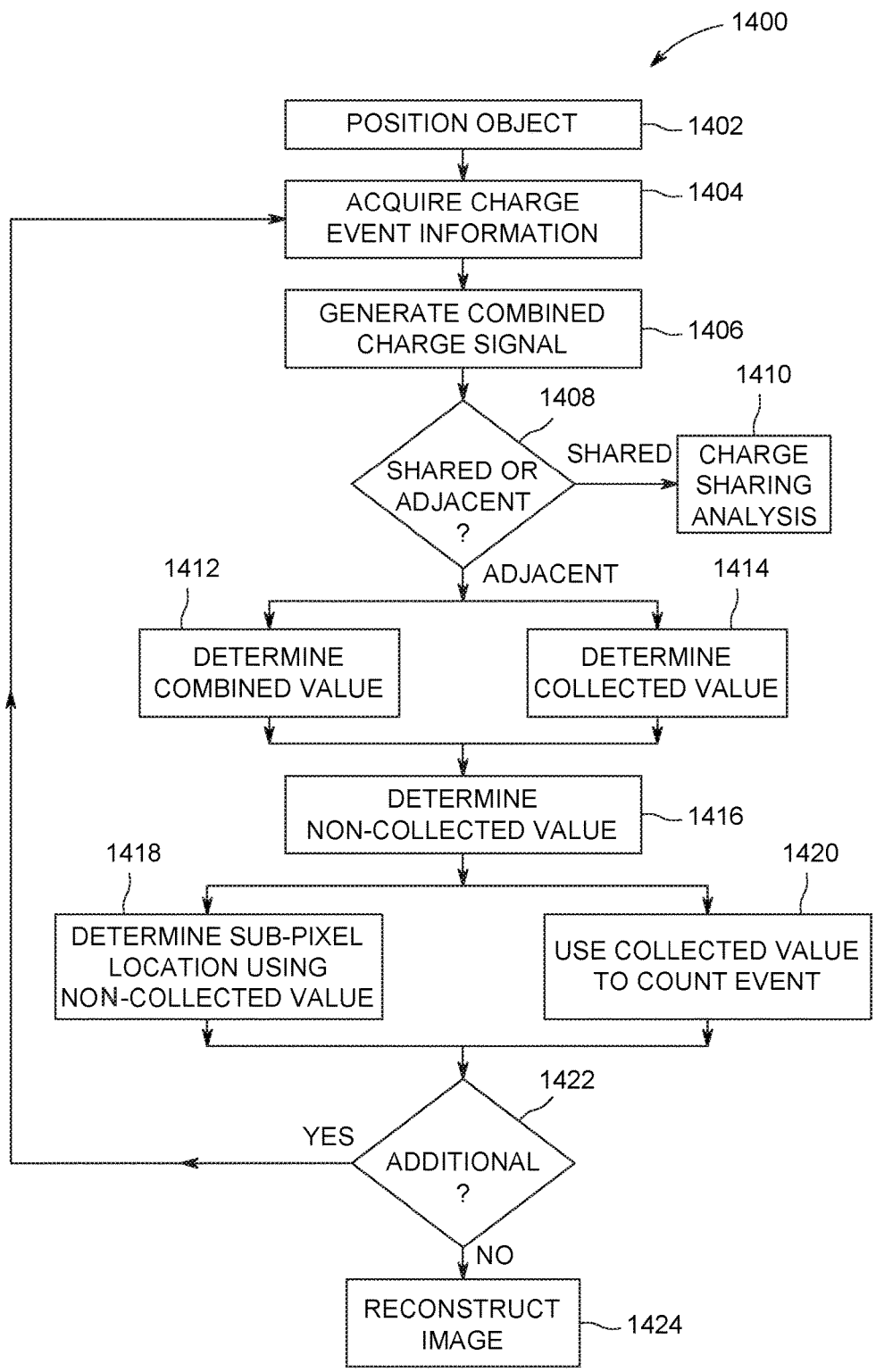
FIG. 14 shows a flowchart of a method, according to an embodiment.

FIG. 14 provides a flowchart of a method 1400 for imaging including detection of simultaneous events in adjacent pixels and determining sub-pixel locations for such events, in accordance with various embodiments. The method 1400, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1400 may be able to be used as one or more algorithms to direct hardware (e.g., one or more aspects of the processing unit 120 of FIG. 1) to perform one or more operations described herein. For ease of description, aspects of the method 1400 are described herein with reference to a single pixel or single group of adjacent pixels. The general principles may be applied to multiple pixels or groups of adjacent pixels of a detector system.

At 1402, an object to be imaged is positioned proximate a detector system. The object may be for example, a human patient or a portion thereof that has been administered a radiopharmaceutical. Radiation emitted from the patient may be detected by the detector system to provide information from which a nuclear medicine image (e.g., a PET image, a SPECT image, a NM image) is to be reconstructed.

At 1404, charge event information is acquired by a radiation detector of the detector system that includes plural pixelated anodes disposed on a surface of the detector. For example, two events (e.g., photon impacts on adjacent pixels) may occur. Charge events may result in at least two different types of charges within a given pixel—a collected charge corresponding to a photon impact on the given pixel, and a non-collected charge corresponding to photon impact on a pixel immediately adjacent to the given pixel. In some embodiments, a shared-charge event may be acquired by one or more pairs of pixels.

At 1406, a combined charge signal is generated by a pixel of the detector system experiencing a charge event (e.g., a charge generated responsive to photon impact on the pixel). The combined charge signal, for example, may include or be formed of a collected charge signal corresponding to charge collected by a given anode due to a photon impact on the given anode, and a non-collected charge signal corresponding to an induced charge due to a photon impact on an adjacent pixel. For example, some pixels of a detector may collect combined charge signals due to photon impacts on adjacent pixels, while other pixels of the detector may collect combined charge signals due to charge-sharing (e.g., as discussed in connection with FIG. 9).

At 1408, it is determined if the combined charge signal is due to a shared-charge event, or due to simultaneous photon impacts in adjacent pixels. In various embodiments, the determination of whether the combined charge signal is due to a charge sharing event or simultaneous collected events in the pixelated anode and the adjacent anode may be performed based on at least one energy level of one detected event. For example, it may be determined that the collected charge signal corresponds to a simultaneous collected event if one or both of the collected charge signal from the pixelated anode and a collected charge signal from the adjacent anode correspond to a nominal event energy level (e.g., the collected charge signals are within a predetermined range of an energy peak associated with a radioisotope used during a scanning process). As another example, it may be determined that the collected charge signal corresponds to a charge sharing event if a sum of the collected charge signal from the pixelated anode and a collected charge signal from the adjacent anode corresponds to a nominal event energy level. If it is determined that the combined charge signal is due to charge-sharing, the method 1400 proceeds to 1410, at which point the combined charge signal is analyzed using charge-sharing analysis techniques, for example, as discussed in connection with FIG. 9. If it is determined that the combined charge signal is due to adjacent photon impacts, the method 1400 proceeds to 1412.

At 1412, a combined value for the collected charge signal and the non-collected charge signal is determined. For example, as discussed herein, because the value of the non-collected charge goes to zero at or near the time of charge collection, the combined value may be determined using a fast shaper configured to capture or determine a peak value of the combined signal before the time of charge collection.

At 1414, a collected value is determined for the collected charge signal. For example, because the value of the non-collected charge goes to zero at or near the time of charge collection, the collected charge signal will have a longer duration and may be determined by examining the signal output from the pixel at a time after the time of charge collection. The value of the signal produced by the collected charge may be determined using a standard shaper configured to capture or determine a peak value of the signal from the pixel after the time of charge collection.

At 1416, a non-collected value for the non-collected charge signal is determined. For example, a peak value of the non-collected charge signal may be determined or estimated by subtracting the peak value of the collected charge signal determined at 1414 from the peak value of the combined charge signal determined at 1412. It may be noted that, while a non-collected value may be calibrated as discussed in connection with FIG. 9 for charge-sharing analysis, the non-collected value in various embodiments for the method 1400 may not be calibrated, as any offset may cancel out when charge values from different pixels, are used to determine sub-pixel locations, for example using Equations 1 and/or 2 discussed herein.

At 1418, the non-collected value is used to determine a sub-pixel location for an adjacent anode (or pixel). For example, the non-collected value from the pixel may be used in conjunction with other non-collected values from other pixels also adjacent to the adjacent anode to determine a distance with respect to the center of the adjacent pixel for the event. (See Equations 1 and 2 and related discussion.) At 1420, the collected value for the given pixel is used to count an event for that pixel. It may be noted that non-collected charges from adjacent pixels may be used to determine a sub-pixel location for the event counted at 1420.

At 1422, it is determined if additional imaging information is to be acquired. If so, the method 1400 returns to 1404. If not, the method 1400 proceeds to 1424. At 1424, an image is reconstructed. For example, all counted events for all pixels over a scanning period may be used to reconstruct an image.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (even if the general purpose computer may become "configured to" perform the task or operation if appropriately programmed) is not "configured to" perform a task or operation unless or until specifically programmed or structurally modified to perform the task or operation.

As used herein, the term "computer," "processor," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A radiation detector system comprising:
   a semiconductor detector having a surface;
   plural pixelated anodes disposed on the surface, at least one of the pixelated anodes configured to generate a collected charge signal corresponding to a charge collected by the pixelated anode and to generate a non-collected charge signal corresponding to a charge collected by an adjacent anode to the pixelated anode; and
   at least one processor operably coupled to the pixelated anodes, the at least one processor comprising a tangible and non-transitory memory having stored thereon instructions configured to direct the at least one processor to:
     determine a collected value for the collected charge signal in the pixelated anode;
     determine a non-collected value for the non-collected charge signal in the pixelated anode corresponding to the charge collected by the adjacent anode;
     use the non-collected value for the non-collected charge signal to determine a sub-pixel location for the adjacent anode; and
     use the collected value to count a single event in the pixelated anode.

2. The detector system of claim 1, wherein the at least one processor is configured to determine a combined value corresponding to a sum of the collected charge signal and the non-collected charge signal, and to determine the non-collected value using a difference between the combined value and the collected value.

3. The detector system of claim 2, wherein the at least one processor is configured to:
   generate a first shaped signal using a first shaper,
   determine the collected value using the first shaped signal,
   generate a second shaped signal using a second shaper, wherein the second shaper has a higher frequency than the first shaper, and
   determine the combined value using the second shaped signal.

4. The radiation detector system of claim 1, wherein the at least one processor is configured to determine if the collected charge signal corresponds to a charge sharing event or simultaneous collected events in the pixelated anode and the adjacent anode.

5. The radiation detector system of claim 4, wherein the at least one processor is configured to determine if the collected charge signal corresponds to a charge sharing event or simultaneous collected events in the pixelated anode and the adjacent anode based on at least one energy level of one detected event.

6. The radiation detector system of claim 5, wherein the at least one processor is configured to determine that the collected charge signal corresponds to a simultaneous collected event if the collected charge signal from the pixelated anode and a collected charge signal from the adjacent anode both correspond to a nominal event energy level.

7. The radiation detector system of claim 5, wherein the at least one processor is configured to determine that the collected charge signal corresponds to a charge sharing event if a sum of the collected charge signal from the pixelated anode and a collected charge signal from the adjacent anode corresponds to a nominal event energy level.

8. The radiation detector system of claim 1, wherein the at least one processor comprises at least one of application specific integrated circuit (ASIC) or a field programmable gate array (FPGA).

9. The radiation detector system of claim 1, wherein the semiconductor detector is comprised of at least one of cadmium zinc telluride (CdZnTe or CZT), cadmium telluride (CdTe), or Silicon (Si).

10. A method comprising:
    acquiring charge event information with a radiation detector comprising plural pixelated anodes disposed on a surface of the radiation detector;
    generating, for a charge event, a combined charge signal comprising a collected charge signal corresponding to a charge collected by a pixelated anode and a non-collected charge signal corresponding to a charge collected by an adjacent anode;
    determining, with at least one processor, a collected value for the collected charge signal in the pixelated anode;
    determining, with the at least one processor, a non-collected value for the non-collected charge signal in the pixelated anode corresponding to the charge collected by the adjacent anode;
    using the non-collected value for the non-collected charge signal to determine a sub-pixel location for the adjacent anode; and
    using the collected value to count a single event in the pixelated anode.

11. The method of claim 10, further comprising determining a combined value corresponding to a sum of the collected charge signal and the non-collected charge signal, and determining the non-collected value using a difference between the combined value and the collected value.

12. The method of claim 11, further comprising:
    generating a first shaped signal using a first shaper,
    determining the collected value using the first shaped signal,
    generating a second shaped signal using a second shaper, wherein the second shaper has a higher frequency than the first shaper, and
    determining the combined value using the second shaped signal.

13. The method of claim 10, further comprising determining if the collected charge signal corresponds to a charge sharing event or simultaneous collected events in the pixelated anode and the adjacent anode.

14. The method of claim 13, wherein determining if the collected charge signal corresponds to a charge sharing event or simultaneous collected events in the pixelated anode and the adjacent anode is performed based on at least one energy level of one detected event.

15. The method of claim 14, further comprising determining that the collected charge signal corresponds to a simultaneous collected event if the collected charge signal from the pixelated anode and a collected charge signal from the adjacent anode both correspond to a nominal event energy level.

16. The method system of claim 14, further comprising determining that the collected charge signal corresponds to a charge sharing event if a sum of the collected charge signal from the pixelated anode and a collected charge signal from the adjacent anode corresponds to a nominal event energy level.

17. A tangible and non-transitory computer readable medium comprising one or more software modules configured to direct one or more processors to:
   acquire charge event information with a radiation detector comprising plural pixelated anodes disposed on a surface of the radiation detector;
   generate, for a charge event, a combined charge signal comprising a collected charge signal corresponding to a charge collected by a pixelated anode and a non-collected charge signal corresponding to a charge collected by an adjacent anode;
   determine a collected value for the collected charge signal in the pixelated anode;
   determine a non-collected value for the non-collected charge signal in the pixelated anode corresponding to the charge collected by the adjacent anode;
   determine a sub-pixel location for the adjacent anode using the non-collected value for the non-collected charge signal; and
   use the collected value to count a single event in the pixelated anode.

18. The tangible and non-transitory computer readable medium of claim 17, wherein the one or more software modules are further configured to direct the one or more processors to:
   determine a combined value corresponding to a sum of the collected charge signal and the non-collected charge signal; and
   determine the non-collected value using a difference between the combined value and the collected value.

19. The tangible and non-transitory computer readable medium of claim 18, wherein the one or more software modules are further configured to direct the one or more processors to:
   generate a first shaped signal using a first shaper,
   determine the collected value using the first shaped signal,
   generate a second shaped signal using a second shaper, wherein the second shaper has a higher frequency than the first shaper, and
   determine the combined value using the second shaped signal.

20. The tangible and non-transitory computer readable medium of claim 17, wherein the one or more software modules are further configured to direct the one or more processors to determine if the collected charge signal corresponds to a charge sharing event or simultaneous collected events in the pixelated anode and the adjacent anode.

* * * * *